United States Patent
Ishii

(10) Patent No.: US 10,841,958 B2
(45) Date of Patent: *Nov. 17, 2020

(54) ACCESS NODE, A METHOD FOR AN ACCESS NODE, A WIRELESS TERMINAL AND A METHOD FOR A WIRELESS TERMINAL

(71) Applicants: SHARP KABUSHIKI KAISHA, Sakai (JP); FG INNOVATION COMPANY LIMITED, Tuen Mun (HK)

(72) Inventor: Atsushi Ishii, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,325

(22) Filed: Oct. 9, 2019

(65) Prior Publication Data

US 2020/0045747 A1    Feb. 6, 2020

Related U.S. Application Data

(63) Continuation of application No. 15/659,060, filed on Jul. 25, 2017, now Pat. No. 10,462,823.
(Continued)

(51) Int. Cl.
*H04W 74/08* (2009.01)
*H04W 48/10* (2009.01)
(Continued)

(52) U.S. Cl.
CPC ....... *H04W 74/0833* (2013.01); *H04W 48/10* (2013.01); *H04W 48/12* (2013.01); *H04W 72/0446* (2013.01); *H04W 88/02* (2013.01)

(58) Field of Classification Search
CPC ..... H04W 48/10; H04W 72/005; H04W 4/06; H04W 48/12; H04W 72/042; H04W 74/0833
See application file for complete search history.

(56) References Cited

U.S. PATENT DOCUMENTS 8,379,567 B2 *  2/2013  Cho ............... H04W 48/12
                                                    370/326
8,538,444 B2     9/2013  Lee et al.
(Continued)

FOREIGN PATENT DOCUMENTS

EP        2 816 741 A2    12/2014
WO    WO 2008/044664 A1    4/2008
(Continued)

OTHER PUBLICATIONS

Notice of Allowance dated Apr. 19, 2019 in U.S. Appl. No. 15/658,980.
(Continued)

*Primary Examiner* — Dung Hong
(74) *Attorney, Agent, or Firm* — ScienBiziP, P.C.

(57) ABSTRACT

Method and apparatus use a value tag in conjunction with transmission and/or processing of system information in a wireless communication network, especially in conjunction with second type system information or non-essentially type system information. In certain example embodiment and modes, an access node (22) may initiate broadcasting second type system information when its content gets updated, in order to avoid many on-demand delivery requests from wireless terminals. In certain example implementations, the access node (22) may compress second type system information to be delivered by broadcast.

6 Claims, 31 Drawing Sheets

Related U.S. Application Data

(60) Provisional application No. 62/368,126, filed on Jul. 28, 2016.

(51) Int. Cl.
  *H04W 48/12* (2009.01)
  *H04W 72/04* (2009.01)
  *H04W 88/02* (2009.01)

(56) References Cited

U.S. PATENT DOCUMENTS

| | | | |
|---|---|---|---|
| 8,837,404 B2* | 9/2014 | Cha | H04W 48/10 370/329 |
| 2009/0221293 A1* | 9/2009 | Petrovic | H04W 72/005 455/450 |
| 2009/0262693 A1 | 10/2009 | Wang et al. | |
| 2010/0227611 A1* | 9/2010 | Schmidt | H04W 4/06 455/434 |
| 2011/0002250 A1* | 1/2011 | Wang | H04W 76/40 370/311 |
| 2015/0223148 A1* | 8/2015 | Shi | H04W 48/10 370/312 |
| 2015/0334766 A1* | 11/2015 | Lee | H04W 48/12 455/426.1 |
| 2016/0143017 A1* | 5/2016 | Yang | H04W 72/0406 370/329 |
| 2016/0150506 A1* | 5/2016 | Tabet | H04W 48/20 370/329 |
| 2016/0234759 A1* | 8/2016 | Kubota | H04W 48/12 |
| 2017/0251500 A1* | 8/2017 | Agiwal | H04W 48/12 |
| 2017/0311290 A1* | 10/2017 | Adjakple | H04W 4/06 |
| 2018/0035468 A1 | 2/2018 | Ishii | |
| 2018/0049024 A1* | 2/2018 | Schliwa-Bertling | H04W 8/30 |
| 2018/0110036 A1* | 4/2018 | Tabet | H04W 72/042 |
| 2018/0132165 A1* | 5/2018 | Takahashi | H04W 48/10 |
| 2019/0029001 A1* | 1/2019 | Wang | H04W 72/005 |

FOREIGN PATENT DOCUMENTS

| | | |
|---|---|---|
| WO | WO 2014/129951 A1 | 8/2014 |
| WO | WO 2015/143244 A1 | 9/2015 |

OTHER PUBLICATIONS

Allowed Claims from U.S. Appl. No. 15/658,980.
International Preliminary Report on Patentability dated Jan. 29, 2019 in PCT Application No. PCT/US17/43587.
International Search Report and Written Opinion dated Oct. 6, 2017 in PCT Application No. PCT/US17/43587.
R2-163853, 3GPP TSG-RAN WG2 Meeting #94, ETRI, "System information handling in NR", Nanjing, China, May 23-27, 2016.
R2-163743, 3GPP TSG-RAN WG2 Meeting #94, ZTE, "Consideration on the System Information in NR", Nanjing, P.R. China, May 23-27, 2016.
R2-163586, 3GPP TSG-RAN WG2 Meeting #94, Intel Corporation, "System information for standalone NR deployment", Nanjing, China, May 23-27, 2016.
R2-163470, 3GPP TSG RAN WG2 Meeting #94, CATT, "System information in NR", Nanjing, China, May 23-27, 2016.
R2-163371, 3GPP TSG-RAN WG2 Meeting #94, Samsung, "System Information Signalling Design in NR", Nanjing, China, May 23-27, 2016.
R2-164127, 3GPP TSG-RAN2 Meeting #94, Huawei, HiSilicon, "System information design", Nanjing, China, May 23-27, 2016.
R2-164122, 3GPP TSG-RAN WG2 Meeting #94, Qualcomm Incorporated, Convida Wireless, "NR System Information Provisioning", Nanjing, China May 23-27, 2016.
Tdoc R2-164088, 3GPP TSG-RAN WG2 #94, InterDigital Communications, "System Information Acquisition for New Radio Access", Nanjing, China, May 23-27, 2016.
R2-164078, 3GPP TSG-RAN WG2 #94 R2-164078, LG Electronics Inc., "Observations about on-demand SI delivery mechanism", Nanjing, China, May 23-27, 2016.
R2-164067, 3GPP TSG-RAN WG2 Meeting #94, Convida Wireless, "NR System Information Aspects", Nanjing, China, May 23-27, 2016.
Tdoc R2-164006, 3GPP TSG-RAN WG2 #94, Ericsson, "Requirements for System Information distribution", Nanjing, P.R. China, May 23-27, 2016.
Tdoc R2-163997, 3GPP TSG-RAN WG2 #94, Ericsson, "Solution principles for system information distribution", Nanjing, P.R. China, May 23-27, 2016.
R2-163980, 3GPP TSG RAN WG2 Meeting #94, NEC, "System information on demand in standalone NR", Nanjing, China, May 23-27, 2016.
R2-163977, 3GPP TSG RAN WG2 Meeting #94, Sony, "System Information Enhancements for NR", Nanjing, China, May 23-27, 2016.
R2-163975, 3GPP TSG-RAN WG2 #94, NTT Docomo, Inc., "System Information design for standalone NR operation", Nanjing, China, May 23-27, 2016.
Office Action dated Sep. 26, 2018 in U.S. Appl. No. 15/659,060.
Notice of Allowance dated Feb. 21, 2019 in U.S. Appl. No. 15/659,060.
Notice of Allowance dated Jun. 17, 2019 in U.S. Appl. No. 15/659,060.
3GPP TS 36.331 V13.2.0, Technical Specification, 3rd Generation Partnership Project; Technical Specification Group Radio Access Network; Evolved Universal Terrestrial Radio Access (E-UTRA); Radio Resource Control (RRC); Protocol specification (Release 13) (Jun. 2016).

* cited by examiner

ACCESS NODE, A METHOD FOR AN ACCESS NODE, A WIRELESS TERMINAL AND A METHOD FOR A WIRELESS TERMINAL

This application is a continuation application of U.S. patent application Ser. No. 15/659,060 filed Jul. 25, 2017, and claims the priority and benefit of U.S. Provisional Patent application 62/368,126, filed Jul. 28, 2016, both of which are incorporated herein by reference in their entirety.

TECHNICAL FIELD

The technology relates to wireless communications, and particularly to methods and apparatus for requesting, transmitting, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB"), broadcasts such system information to its coverage area via several System Information Blocks (SIBs) on downlink radio resources allocated to the access node.

A wireless terminal ("UE"), after entering a coverage area of an eNB, is required to obtain all the SIBs which are necessary to access to the system. For sake of UEs under coverage, the eNB periodically broadcasts all SIBs relevant for offered services, not just SIBs that are required for access to the system. Each type of SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for more efficient transmission of system information blocks (SIBs).

SUMMARY

In one of its example aspects the technology disclosed herein concerns an access node of a radio access network comprising processor circuitry and a transmitter. The processor circuitry is configured, upon a change of content of system information, to include, in a broadcast message comprising first system information which is broadcast from the access node, an indication of when the access node is scheduled to broadcast second system information which is not included in the first system information. The transmitter is configured to transmit, over a radio interface, the broadcast message comprising the first system information and thereafter the broadcast of the second system information according to the indication.

In another of its example aspects the technology disclosed herein concerns a method in an access node of a radio access network. In a basic mode the method comprises: upon a change of content of system information, using processor circuitry to include, in a broadcast message comprising first system information which is broadcast from the access node, an indication of when the access node is scheduled to broadcast second system information which is not included in the first system information; and, transmitting, over a radio interface, the broadcast message comprising the first system information and thereafter the broadcast of the second system information according to the indication.

In yet another of its example aspects the technology disclosed herein concern a wireless terminal which communicates over a radio interface with an access node of a radio access network. The wireless terminal comprises a receiver and processor circuitry. The receiver is configured to receive messages from the access node including a first broadcast message and a second broadcast message. The processor circuitry is configured to: determine, from the first broadcast message, scheduling information concerning the second broadcast message; and obtain system information from the second broadcast message based on the scheduling information.

In still another of its example aspects the technology disclosed herein concerns a method in a wireless terminal which communicates over a radio interface with an access node of a radio access network. In a basic mode the method comprises: receiving messages from the access node including a first broadcast message and a second broadcast message; and, using processor circuitry to: determine, from the first broadcast message, scheduling information concerning the second broadcast message; obtain system information from the second broadcast message based on the scheduling information

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
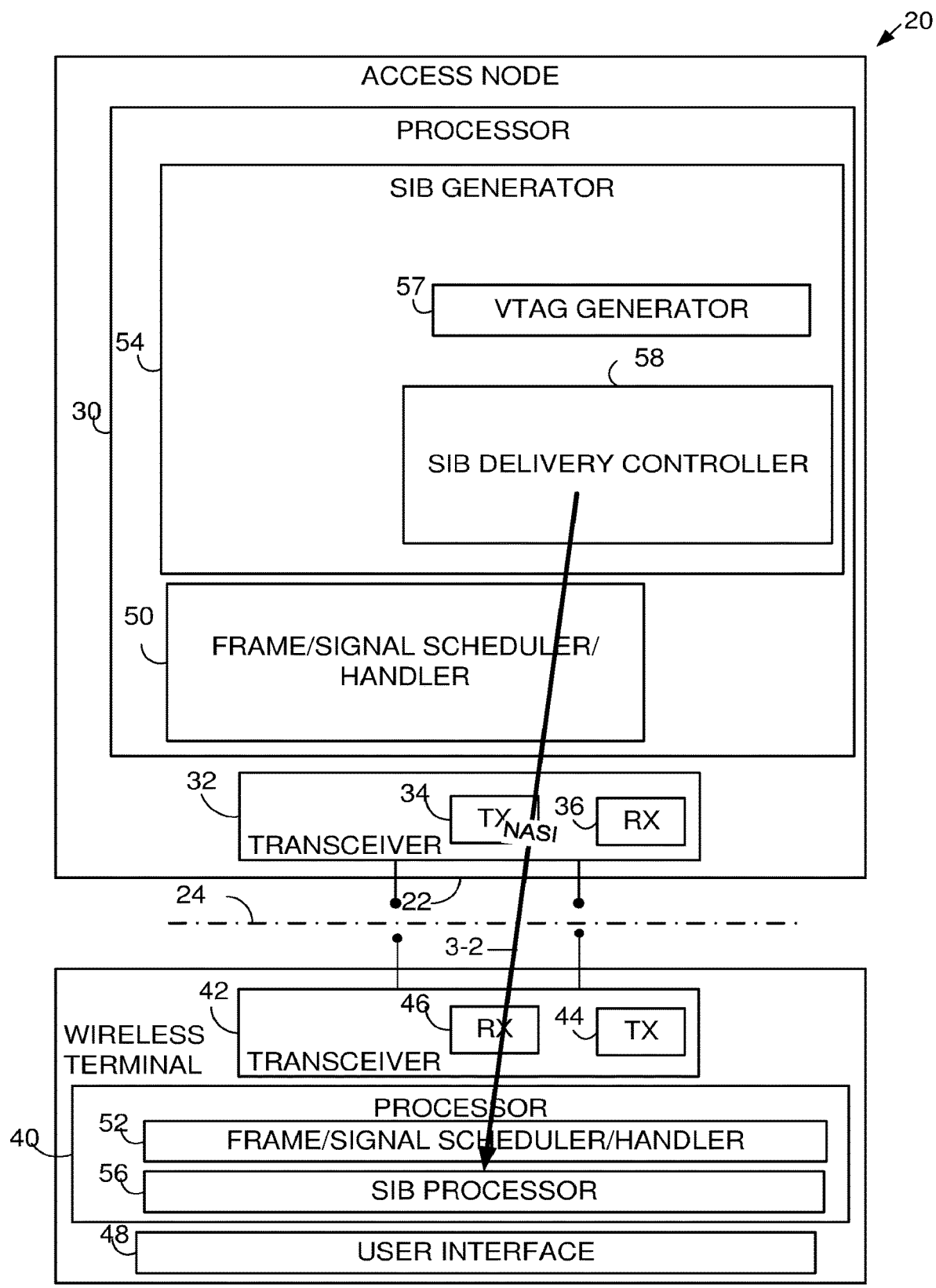
FIG. 1 is a schematic view showing an example communications system comprising a radio access node and a wireless terminal, and wherein the radio access node provides a value tag for system information (SI).

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNB, or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

FIG. 1 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB"), for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The respective transmitter circuits 34 and 44 may comprise, e.g., amplifier(s), modulation circuitry and other conventional transmission equipment. The respective receiver circuits 36 and 46 may comprise, e.g., e.g., amplifiers, demodulation circuitry, and other conventional receiver equipment.

In general operation node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 1 are shown as comprising respective information handlers. For an example implementation in which the information is communicated via frames, the information handler for radio access node 22 is shown as node frame/signal scheduler/ handler 50, while the information handler for wireless terminal 26 is shown as terminal frame/signal handler 52.

The node processor 30 of radio access node 22 also includes a system information (SI) generator 54. The wireless terminal 26 uses the system information (SI) generated by radio access node 22, and even in some example implementations specifically requests certain system information (SI), in on-demand fashion. To that end the terminal processor 40 of wireless terminal 26 is shown as comprising SIB processor 56.

The node processor 30, and system information (SI) generator 54 in particular, generates a value tag which is associated with the system information (SI). The value tag, also known as a version tag or "Vtag", is configured to provide an indication of the version or vintage of system information with which the value tag is associated. In example implementations the value tag may take the form of a numeral or character, e.g., "1" for first version, "2" for second version, etc., or "A" for first version, "B", for second version, etc. Any other convention for differentiating between values or versions may instead be employed. To this end system information (SI) generator 54 is shown as comprising value tag generator 57.

The value tag generator 57 serves, e.g., to change the value tag when a parameter of the system information is changed. For example, the value tag generator 57 may increment a number of the value tag when a parameter of the second type system information is changed.

Figure 2:
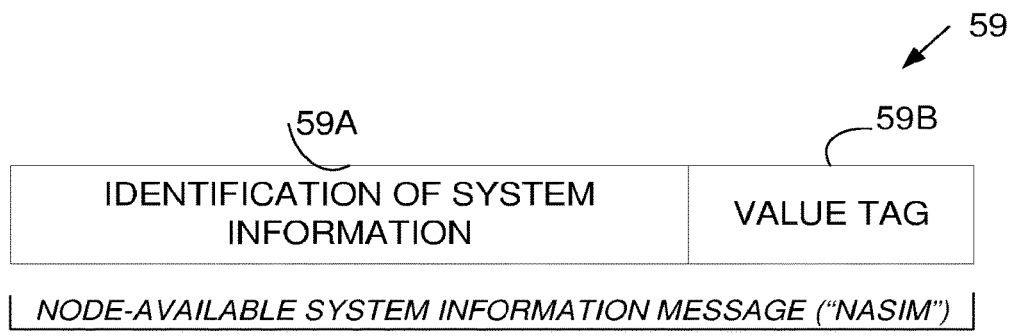
FIG. 2 is a diagrammatic view of a node-available system information message according to an example embodiment and mode.

The system information (SI) generator 54 also comprises SIB delivery controller 58, which controls the timing and content of delivery of system information (SI), as well as timing and delivery of certain node-available system information ("NASI"). In an example embodiment and mode, illustrated in FIG. 2, the node-available system information comprises a node-available system information message NASIM 59 which includes both an identification of the system information that is available from the radio access node 22, and the value tag associated with that available system information. To this end, the NAAIM 59 of FIG. 2 shows an identification of system information field or information element 59A, and a value tag field or information element 59B.

Figure 3:
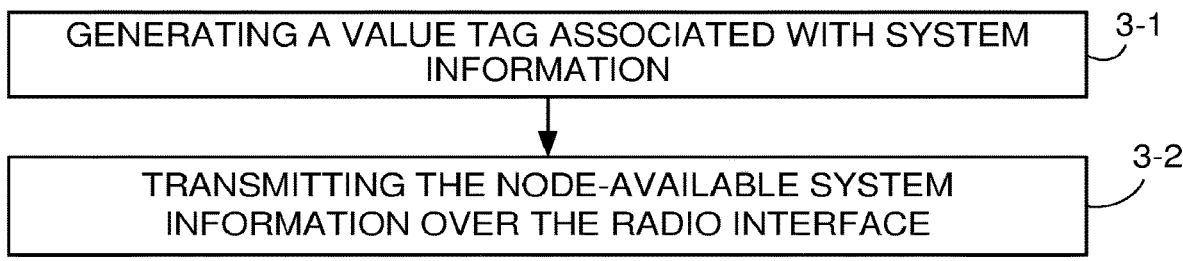
FIG. 3 is a flowchart showing example, representative, basic acts or steps performed by the radio access node of FIG. 1.

FIG. 3 depicts certain example, representative, basic acts or steps performed by the radio access node 22 of FIG. 1. Act 3-1 comprises generating a value tag associated with system information that is available at the radio access node 22. As is understood in the art, the system information facilitates use of communication services provided by the access node. Act 3-2 comprises transmitting over the radio interface 24 the node-available system information ("NASI"). Such transmission may be by means of the node-available system information message NASIM 59. An arrow 3-2 in FIG. 1 corresponds to act 3-2 (and, in an example implementation, to the node-available system information message NASIM 59). As indicated above and with respect to FIG. 2, the node-available system information message comprises an identification of the system information and the value tag associated with the system information.

Figure 4:
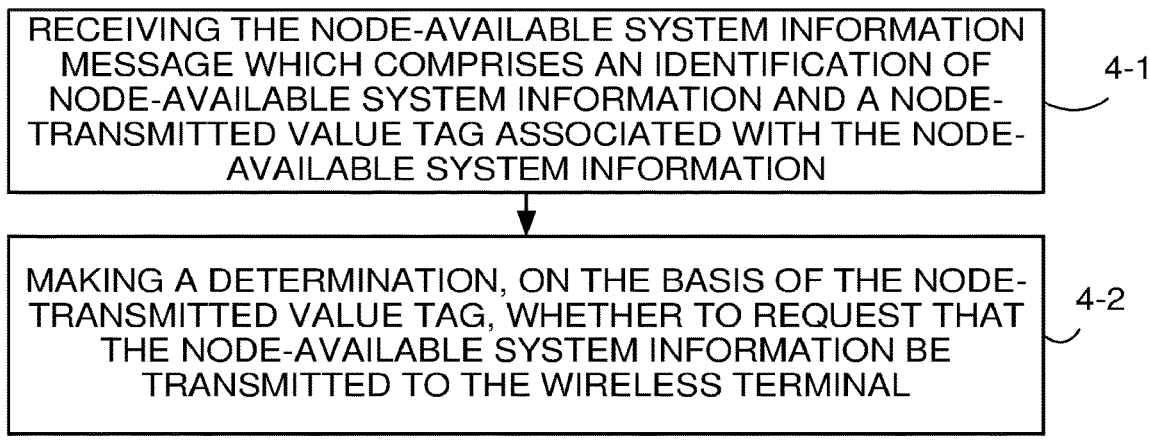
FIG. 4 is a flowchart showing example, representative, basic acts or steps performed by the wireless terminal of FIG. 1

FIG. 4 depicts certain example, representative, basic acts or steps performed by the wireless terminal 26 of FIG. 1. Act 4-1 comprises receiving, from the radio access node 22, the node-available system information message (3-2) which comprises an identification of node-available system information and a node-transmitted value tag associated with the node-available system information. Act 4-2 comprises making a determination, on the basis of the node-transmitted value tag, whether to request that the node-available system information be transmitted to the wireless terminal. If the determination of act 4-2 indicates that the available system information as advertised in the node-available system information message (3-2) should be obtained (e.g., because that available system information has a more recent value tag), then the wireless terminal 26 sends a request message to the radio access node 22 to obtain the advertised system information.

Figure 5:
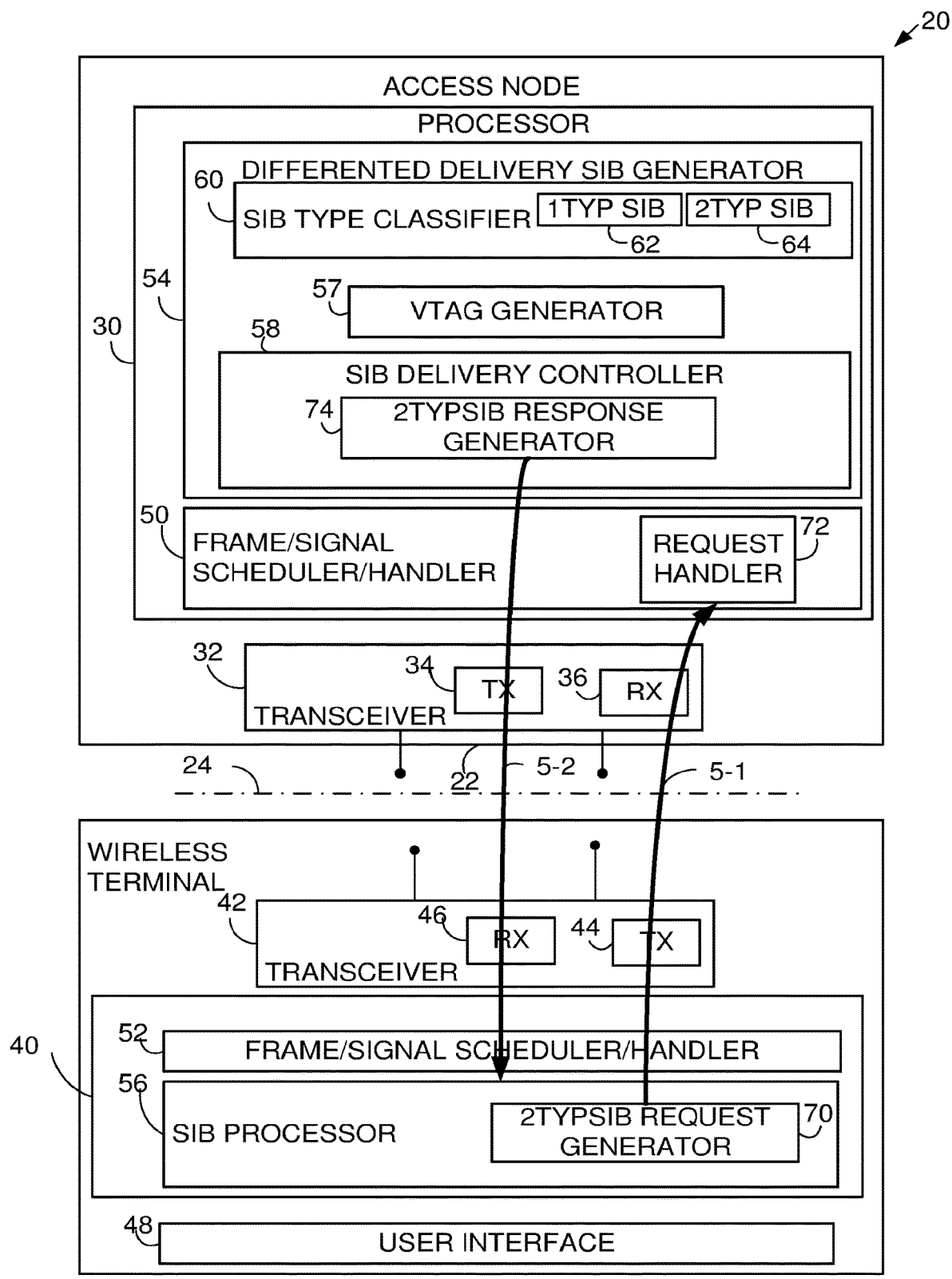
FIG. 5 is a schematic view showing an example communications system comprising a radio access node and a wireless terminal, and wherein the radio access node provides a value tag for system information (SI) along with differentiated delivery of system information (SI).

FIG. 5 illustrates certain example embodiment and mode wherein system information (SI) is classified into plural categories or types, and delivery of each category or type of system information (SI) is separately triggered and thus separately delivered across radio interface 24 to one or more wireless terminals. Accordingly, the system information (SI) generator of radio access node 22 is also known as differentiated delivery SIB generator 54.

In view of the fact that, in certain example embodiments and modes, the system information (SI) is classified into plural categories or types, the system information (SI) generator 54 is depicted in FIG. 5 as comprising SIB type classifier 60 which defines the plural categories or types of system information, and may further define an association between the plural types and respective system information blocks. For sake of example two representative categories or types of system information (SI) are shown as defined by the SIB type classifier 60 in FIG. 5: a first type of system information (1TYP SIB) and a second type of system information (2TYP SIB). Definitions and procedures for handling for the first type of system information (1TYP SIB) and the second type of system information (2TYP SIB) may be selectively configured and maintained, and are accordingly reflected by 1TYPSIB controller 62 and 2TYPSIB controller 64, respectively.

In an example embodiment and mode, the first type of system information (1TYP SIB) is SIB "essential system information", which means system information (SI) which is essential to or minimally required by the wireless terminal 26 for initial access to the radio access network and to radio interface 24 in particular. Essential system information may be also referred as "minimum system information". On the other hand, in the same example embodiment and mode, the second type of system information (2TYP SIB) is non-essential system information (SI). "Non-essential" system information (SI) is defined as all other types of information, and thus excludes the minimal information required for initial access. Non-essential system information may be also referred as "other system information". As such the second type of system information (2TYP SIB) may facilitate utilization of certain features or services provided by or through radio access node 22. Thus, the first type system information comprises information which is periodically broadcasted by the transmitter and which is required for initial access to the radio access network, but the second type system information is not required for initial access to the radio access network.

In example embodiments and modes described herein, the radio access node 22 separately delivers the different types of system information, e.g., delivers the second type of system information (2TYP SIB) separately from the first type of system information (1TYP SIB). For example, the node processor 30 may schedule periodic transmissions by the transmitter of first type system information over the radio interface; and thereafter or separately from the periodic transmissions of the first type system information, schedule transmission by the transmitter of second type system information over the radio interface. Accordingly, in example embodiments and modes, the SIB delivery controller 58, among other things, may implement the "differentiated" delivery of the second type of system information (2TYP SIB) apart from the first type of system information (1TYP SIB). As explained herein, the transmission of second type system information may be either by unicast or broadcast.

FIG. 5 further illustrates that wireless terminal 26 may, after obtaining initial access to the communications system 20 (e.g., as a result of receiving the first type of system information (1TYP SIB)), recognize or appreciate that the wireless terminal 26 may need the second type of system information (2TYP SIB). Thus the wireless terminal 26 may make a special request for the second type of system information (2TYP SIB). The FIG. 5 embodiment and mode is thus an example of the radio access node 22 providing second type system information "on demand". Such request or demand for second type of system information (2TYP SIB) may arise, for example, when the wireless terminal 26 seeks to utilize a certain service provided by the communications system 20 or a functionality of wireless terminal 26 which, although not required for access, may enhance operation of wireless terminal 26. Accordingly, FIG. 5 shows the SIB processor 56 of wireless terminal 26 as comprising 2TYPSIB request generator 70, which may generate a 2TYPSIB request depicted by arrow 5-1.

FIG. 5 further shows node frame/signal scheduler/handler 50 as comprising 2TYPSIB request handler 72, and further shows the SIB delivery controller 58 as comprising 2TYPSIB response generator 74. In the FIG. 5 embodiment and mode, the 2TYPSIB response generator 74 generates a response message 5-2 which includes one or more requested system information blocks (SIBs), e.g., includes at least one block of the second type system information.

Thus, in the FIG. 5 embodiment and mode, the node processor 30 schedules periodic transmissions by the transmitter of first type system information over the radio interface. Thereafter or separately from the periodic transmissions of the first type system information, and upon request by the wireless terminal 26, the node processor 30 schedules transmission by the transmitter of second type system information over the radio interface. The request by the wireless terminal 26 may arise after the wireless terminal 26 receives the node-available system information message NASIM 59, which advises of the value tag for the node-available system information. Thus, in the FIG. 5 embodiment and mode, the value tag is associated with the second type system information.

Figure 6:
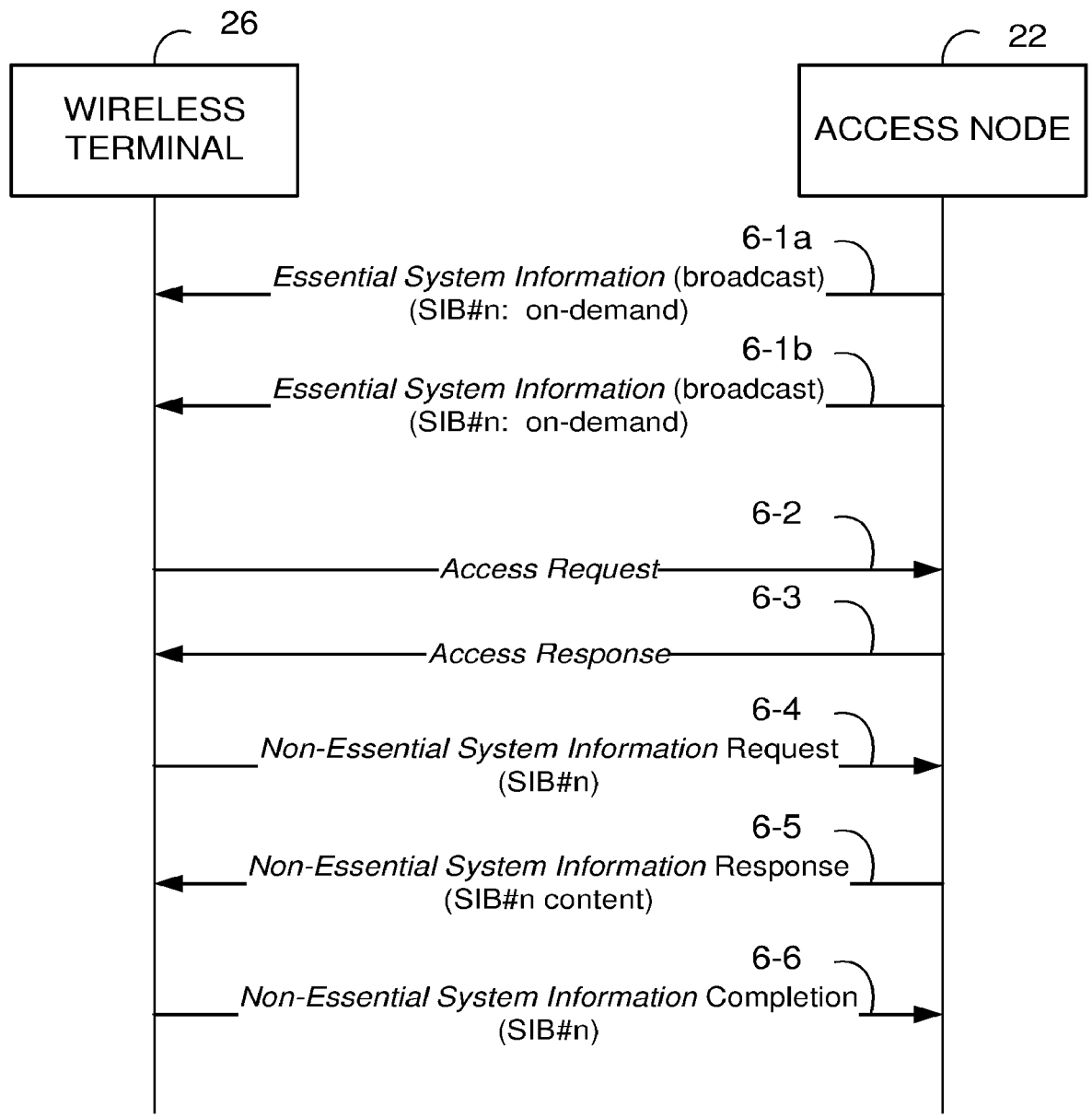
FIG. 6 is a diagrammatic view showing example message flow for the example communications system of FIG. 5.

FIG. 6 shows an exemplary message flow for the embodiment of FIG. 5. In the FIG. 6 message flow, when a wireless terminal enters the coverage area of the radio access node 22, the wireless terminal first receives from the radio access node 22 the Essential System Information (i.e., first type of system information (1TYP SIB), and in particular receives Essential System Information periodically broadcasted in messages containing the essential SIB(s) as information elements. The periodic broadcast by the radio access node 22 of the Essential System Information is shown by messages 6-1a and 6-1b of FIG. 6, it being understood (in FIG. 6 and other similar drawings) that there may be more than two such broadcast messages. An example Essential System Information message for the FIG. 5 embodiment and mode is shown in FIG. 7 and hereinafter described.

Figure 7:
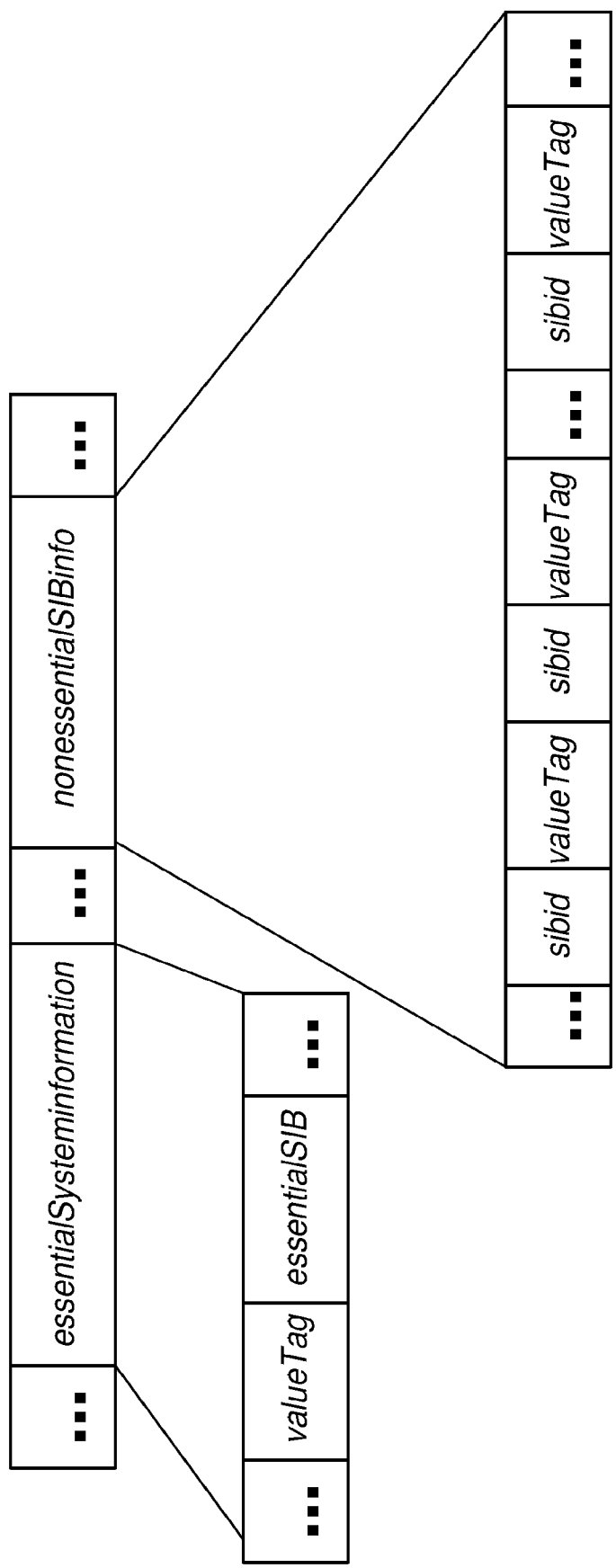
FIG. 7 is a diagrammatic view showing an example format of an Essential System Information message according to an example implementation of the system of FIG. 5.

As shown in FIG. 7, the Essential System Information message may comprise a nonEssentialSIBInfo information element which includes the identification of the non-essential SIBs. If the nonEssentialSIBInfo information element is not present in the message, or if the information element is present but the list is empty, the wireless terminal assumes that all the SIBs from this radio access node 22 are essential SIBs.

Upon receiving the Essential System Information, i.e., the first type of system information (1TYP SIB), the wireless terminal 26 initiates the system access procedure by sending an Access Request message 6-2, which is acknowledged by radio access node 22 with an Access Response message 6-3. Following the system access procedure (comprised of the acts just described), the wireless terminal 26 sends a Non-essential System Information Request message 6-4 to radio access node 22. The Non-essential System Information Request message 6-4 may be generated by 2TYP SIG request generator 70 of FIG. 5, and may include an indication of one or more pieces of second type of system information (2TYP SIB), e.g., one or more SIB numbers (SIB #), that the wireless terminal 26 desires. The wireless terminal 26 was made aware of the existence of the second type of system information by the nonessentialSIBinfo information element. Such indication of desired SIB # may be expressed in an information element of the Non-essential System Information Request message 6-4. The Non-essential System Information Request message 6-4 may be sent using uplink dedicated resources (e.g., radio resources of a frame).

In response to the Non-essential System Information Request message 6-4, the radio access node 22 may send Non-essential System Information Response message 6-5 using the downlink dedicated resources. The Non-essential System Information Response message 6-5 comprises the requested SIB # n (e.g., the SIB # n requested by the wireless terminal 26). The requested SIB # n may be included in an information element of the Non-essential System Information Response message 6-5. Afterwards, when the wireless terminal 26 has successfully obtained the requested SIB # n from the Non-essential System Information Response message 3-5, the wireless terminal 26 may send to the radio access node 22 a Non-essential System Information Completion message 6-6, at which point the radio access node 22 may release the uplink/downlink dedicated resources. Alternatively, the radio access node 22 may release the uplink/downlink dedicated resources after sending Non-essential System Information Response message 6-5.

An example Essential System Information message for the FIG. 5 embodiment and mode is shown in FIG. 7. In the embodiment and mode of FIG. 5 and FIG. 6, one or more and preferably a non-essential (e.g., second type) SIB is associated with a value tag that uniquely identifies a specific version of content for that SIB. When broadcasting Essential System Information message, the radio access node 22 of FIG. 5 includes the value tags for the latest contents of non-essential SIBs. Further, the value tag changes when any configuration parameters in the corresponding SIB gets updated. In one example implementation, the value tag is incremented by one upon the SIB update. Other types of modifications, e.g., decrementation, version prefixes or suffixes, may be employed.

FIG. 7 shows an example format of the Essential System Information message, wherein the nonEssentialSIBInfo information element each sibId is paired with valueTag, the value tag of the corresponding non-essential SIB. Thus, in an example implementation, the node-available system information message NASIM 59 may be an Essential System Information message as shown in FIG. 7. FIG. 7 particularly shows that the Essential System Information message may also, when functioning as the node-available system information message NASIM 59, include an information element specifying what non-essential SIBs are available at this radio access node 22 upon request. FIG. 7 shows the essentialSystemInformation information element carrying at least one essential SIB and a nonEssentialSIBInfo information element may include a list of identifiers (sibId's) for such available non-essential SIBs. In addition, for one or more and preferably each non-essential SIBs a value tag is provided in the nonEssentialSIBInfo information element.

FIG. 7 also shows that Essential SIB(s) may be also associated with at least one value tag, which is different from the ones for non-essential SIBs, and may be conveyed as a part of the Essential System Information message.

In certain example embodiments and modes, the value tag of a non-essential SIB may be valid within one radio access node 22, e.g., valid within a coverage area or cell served by the radio access node 22. But in other example embodiments and modes, the value tag may have collective applicability, e.g., be capable of expressing a value for more than one cell, for more than one piece of system information (e.g., more than one SIB), etc. In other words, the applicable "base" of the value tag, the information to which the value tag pertains, may be selectively defined in terms of various factors such as area, number of SIBs, and so forth.

Figure 8:
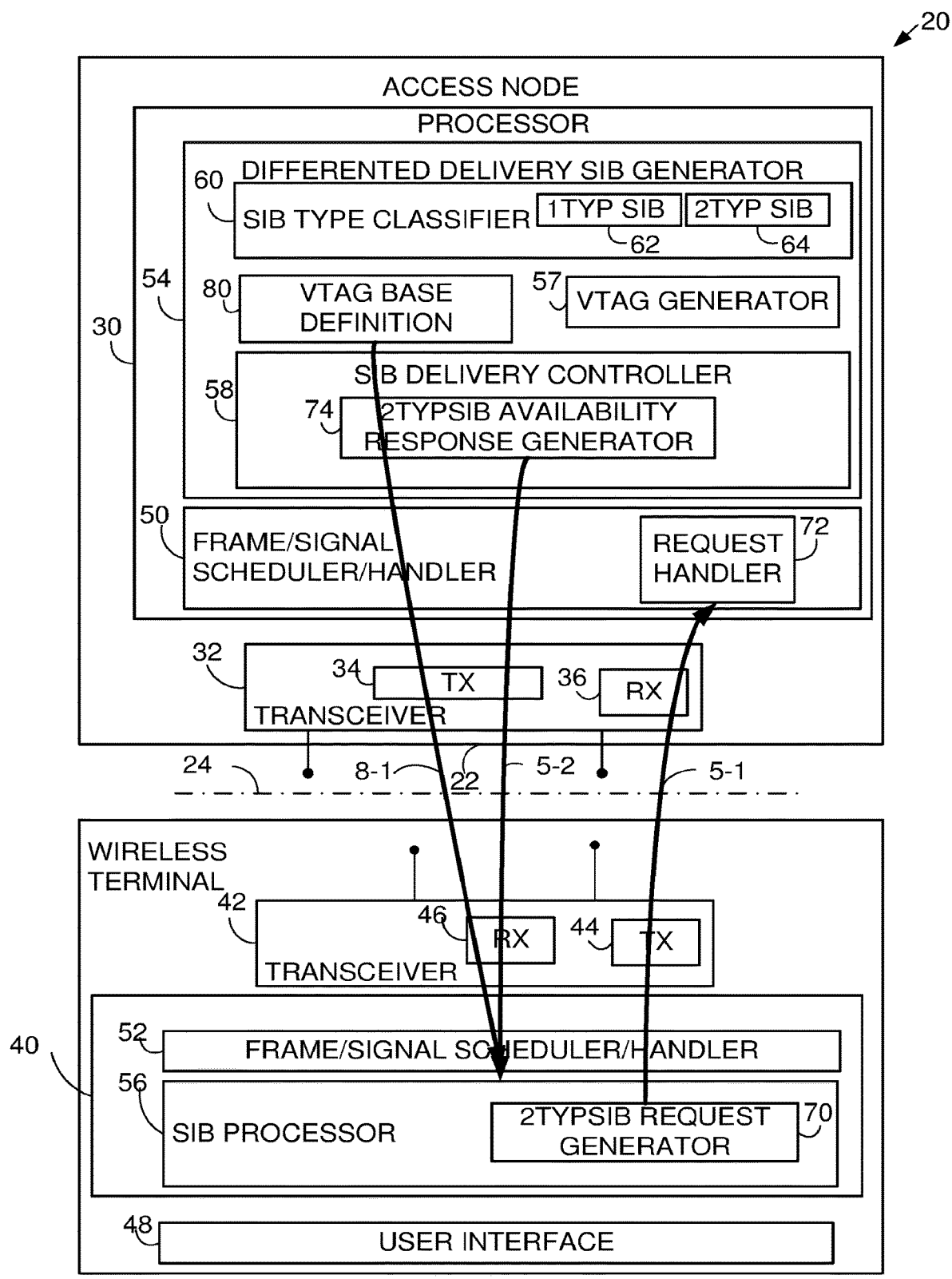
FIG. 8 is a schematic view showing an example communications system comprising a radio access node and a wireless terminal, and wherein the radio access node provides a value tag for system information (SI) along with definition of a base of second type system information to which the value tag applies.

In the above regard, in an example embodiment and mode shown in FIG. 8, the system information (SI) generator 54 includes not only the value tag generator 57, but also logic, memory, or controller for a value tag base definition 80. In an example implementation, for example, the value tag base definition 80 may specify that the value tag is valid in at least one geographical area comprising a plurality of radio access nodes. Thus, the node processor 30 may generate the value tag to be valid in a geographical area served by the access node and a group of at least one other access node. In such example implementation, the value tag base definition 80, or value tag "validity area", may be separately signaled from the radio access nodes to the wireless terminals in their respective coverage areas. That is, the node processor 30 may generate a signal (such as signal 8-1 of FIG. 8) to define the group of other access nodes.

Thus, in the FIG. 8 embodiment and mode, a wireless terminal may consider a non-essential system information, a second type SIB, to be "current" if (1) it was received in the validity area of the radio access node upon which the wireless terminal is camping; (2) the value tag of the received non-essential SIB is the same as the one that the camped radio access node is currently advertising in the Essential System Information message, and (3) it was received within a pre-determined or network-configured time period from the present time.

Figure 9:
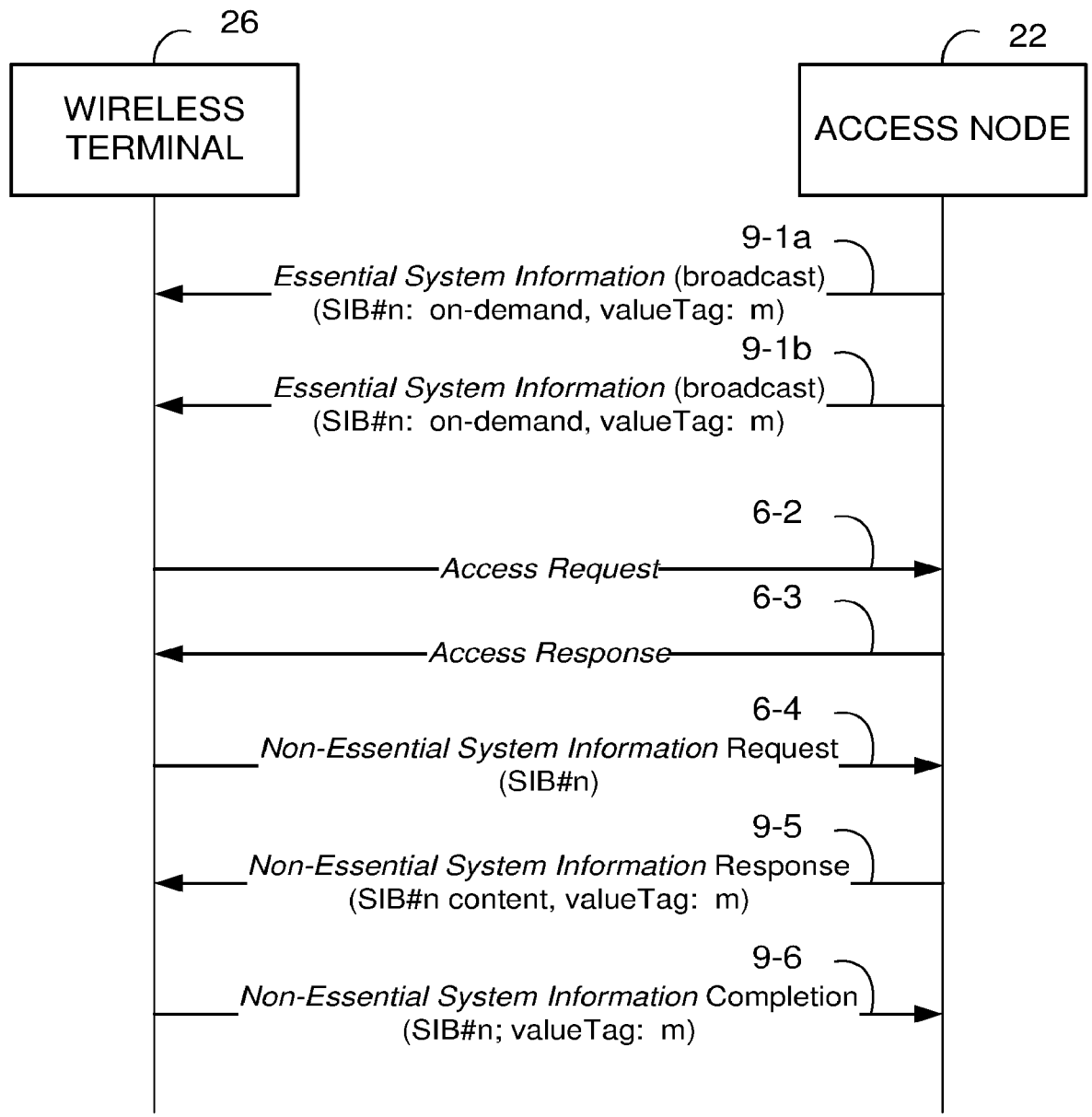
FIG. 9 is a diagrammatic view showing example message flow for the example communications system of FIG. 8.

FIG. 9 shows an example message flow for the example embodiment and mode of FIG. 8. In the example embodiment and mode of FIG. 8 it is assumed that the wireless terminal 26 makes an on-demand request for second type system information (SI). Accordingly, in FIG. 9, the Essential System Information messages 9-1a and 9-1b are indicated as being "SIB # n: on-demand". Further, as explained above, the Essential System Information messages 9-1a and 9-1b may include the value tag ("valueTag: m"). After receiving the Essential System Information, the wireless terminal 26 may perform an access procedure comprising Access Request message 6-2 and Access Response message 6-3.

In the FIG. 9 scenario the wireless terminal 26 may not need to take further action respecting the second type of system information if the wireless terminal 26 has previously received the SIB # n and the value tag for the previously-received SIB # n as stored at the wireless terminal 26 is current (e.g., is "m"). Otherwise, if the wireless terminal 26 has a value tag for the SIB # n which is older than "m", the wireless terminal 26 may proceed to request the SIB # n transmission using the Non-Essential System Information Request message 6-4, in a manner similar to that described in a previous embodiment.

Thus, in the example embodiment and mode of FIG. 8 and FIG. 9, the Non-essential System Information Response message and/or Non-essential System Information Completion message may contain the value tag with the current value (valueTag=m).

Figure 10:
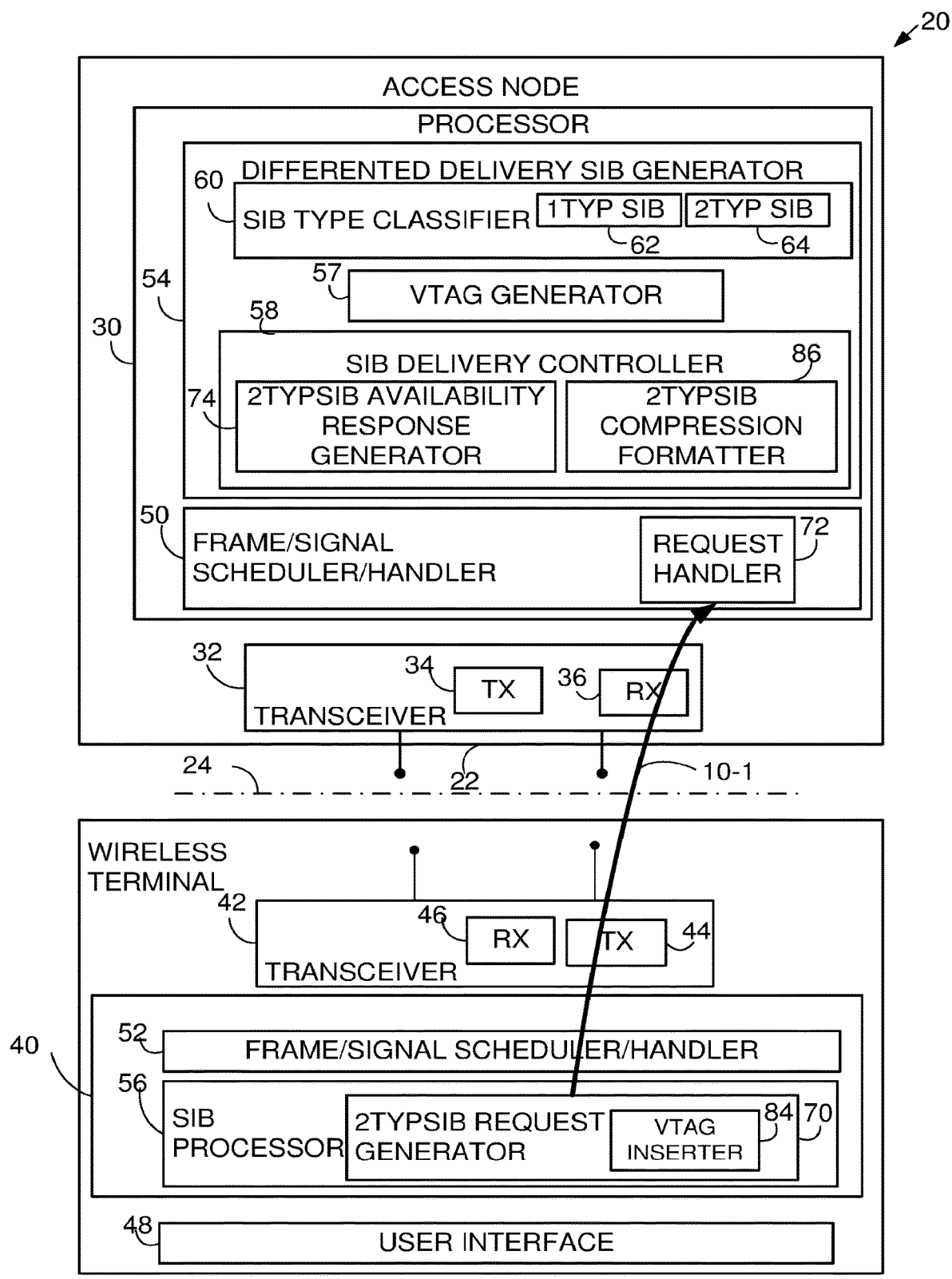
FIG. 10 is a schematic view showing an example communications system comprising a radio access node and a wireless terminal, and wherein the wireless terminal provides a stored value tag for stored second type system information system information (SI) when requesting second type system information from the radio access node.

In an example embodiment and mode shown in FIG. 10, the wireless terminal 26 may optionally include in request message 10-1 (requesting the second type system information) the stored values tags of the requested second type system information. This may occur in a situation in which the wireless terminal 26 already has stored values for the second type system information and already has stored value tags for the stored second type system information, but the wireless terminal 26 does not know if the stored second type system information is or is not truly current in terms of network usage for each of the stored SIBs of the second type system information. The wireless terminal 26 may request second type system information for plural different second type system information SIBs, and the plural second type system information SIBs may each have different value tags.

In the example embodiment and mode of FIG. 10, the wireless terminal 26 comprises value tag inserter functionality 84, which includes in the request message 10-1 the stored value tag for the second type system information already stored at wireless terminal 26. Moreover, as understood below, the radio access node 22 and SIB delivery controller 58 in particular may comprise a compression formatter for the second type system information, e.g., 2TYPSIB compression formatter 86.

Thus, the FIG. 10 example embodiment and mode is similar to the embodiment and mode of FIG. 8, but the wireless terminal 26 may optionally include in the Nonessential System Information Request message 10-1 the value tags of the requested non-essential SIBs, where the wireless terminal 26 obtained those value tags when it previously received the corresponding non-essential SIBS.

Figure 11:
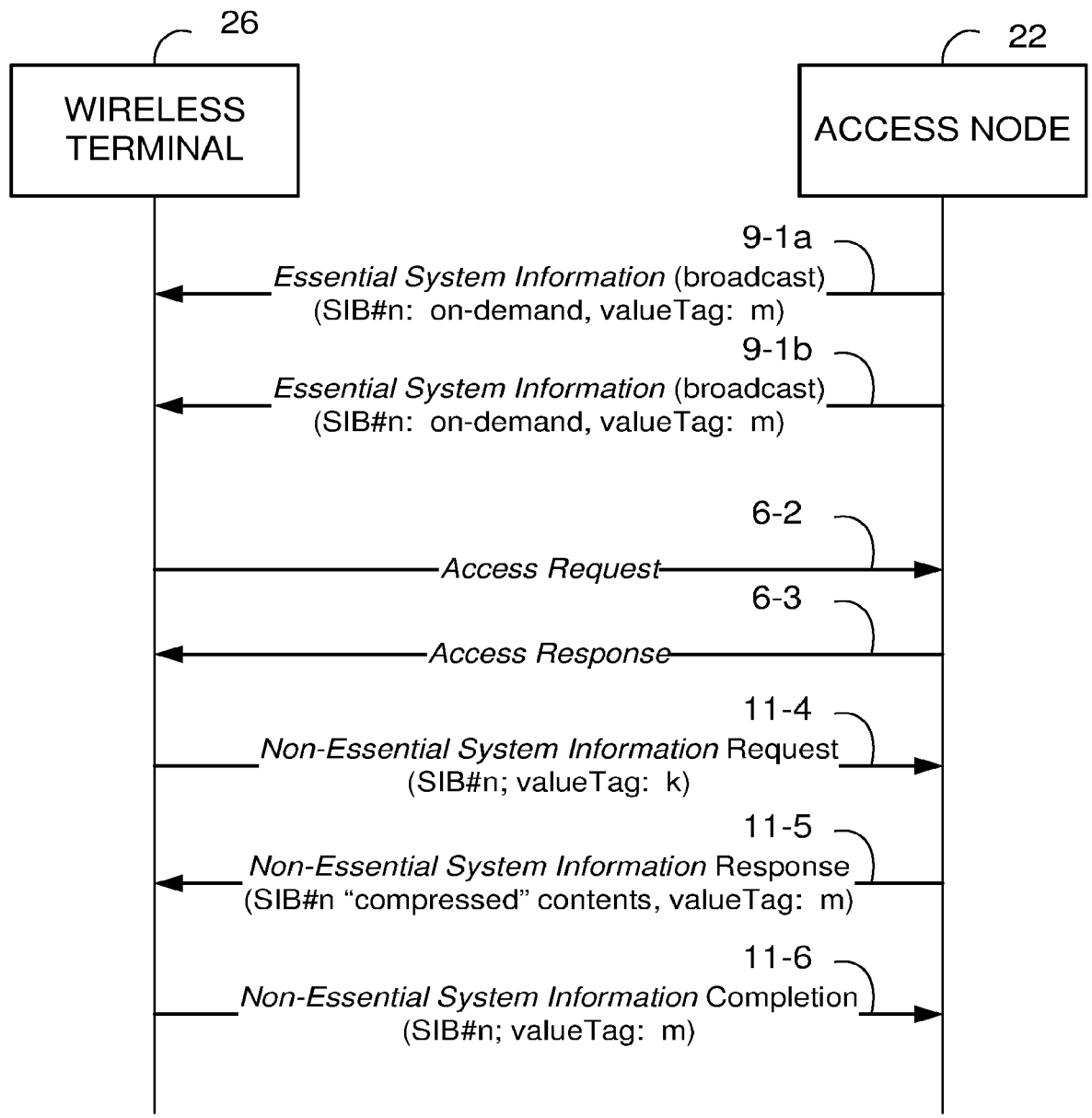
FIG. 11 is a diagrammatic view showing example message flow for the example communications system of FIG. 1.

An exemplary scenario of the FIG. 10 embodiment and mode is illustrated in the message flow of FIG. 11. FIG. 11 shows, by the Non-essential System Information Request message 11-4 (which corresponds to message 10-1 of FIG. 10), that valueTag=k for its requested SIB # n. Based on this received value tag, the radio access node 22 and the 2TYPSIB compression formatter 86 in particular may compose "compressed" content of the SIB # n to be delivered via Non-essential System Information Response message 11-5.

In one example implementation of FIG. 10 and FIG. 11, the compressed content comprises the differences between the current SIB # n (valueTag=m) and the previously transmitted (valueTag=k). For example, if SIB # n consists of parameters p1 to p10 and if only p3 and p7 have been updated (if the radio access node 22 has newer values only for parameters P3 and p7 of second type system information), the compressed content of the Non-essential System Information Response message 11-5 may include only p3 and p7 with updated values.

Figure 12:
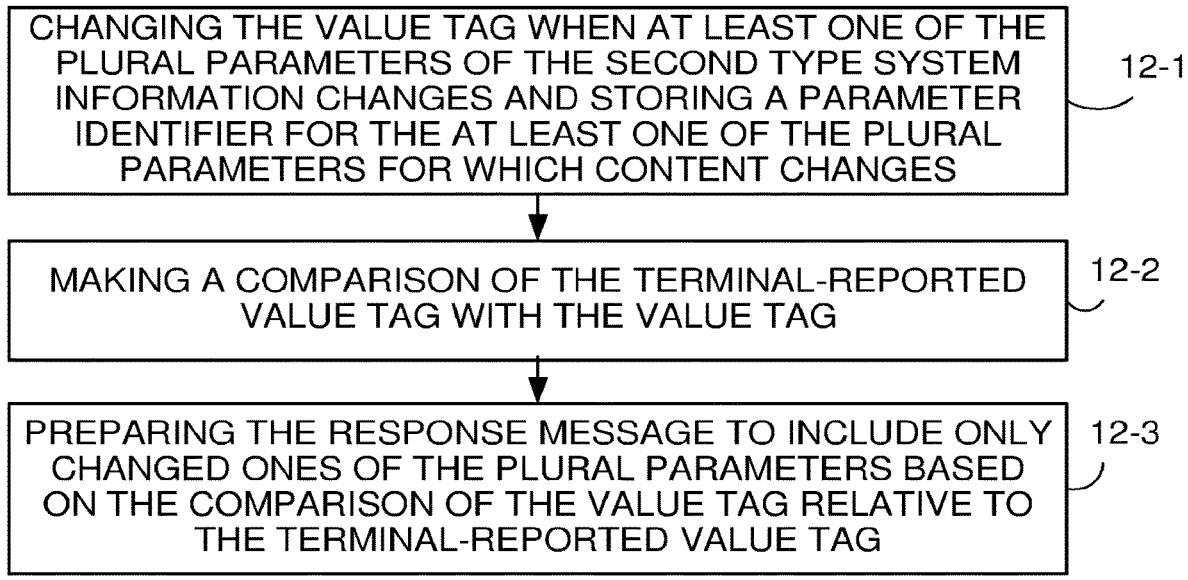
FIG. 12 is a flowchart showing example, representative, basic acts or steps performed by the radio access node of FIG. 10 in implementing certain acts of FIG. 11.

Thus the example embodiment and mode of FIG. 10 and FIG. 11 is particularly but not exclusively applicable to situations in which the second type system information comprises plural parameters and the receiver is configured to receive a wireless terminal-reported value tag in the request message. Basic example acts performed by radio access node 22 in conjunction with the example embodiment and mode of FIG. 10 and FIG. 11 are shown in FIG. 12. Act 12-1 comprises the node processor 30 (and system information (SI) generator 54 in particular) changing the value tag when at least one of the plural parameters of the second type system information changes and to store a parameter identifier for the at least one of the plural parameters for which content changes. Act 12-2 comprises making a comparison of the terminal-reported value tag (e.g., the value tag reported in the request message 10-1) with the value tag (the changed value tag). Act 12-3 comprises preparing the response message (e.g., the Non-essential System Information Response message 11-5) to include only changed ones of the plural parameters based on the comparison of the value tag relative to the terminal-reported value tag.

In some cases, the radio access node 22 may have an option to send the non-compressed versions of the requested non-essential SIBs even if the Non-essential System Information Request message contains value tags. One example of such cases is where the radio access node 22 no longer stores the contents of the previously transmitted non-essential SIBs indicated by the received value tags.

Figure 13:
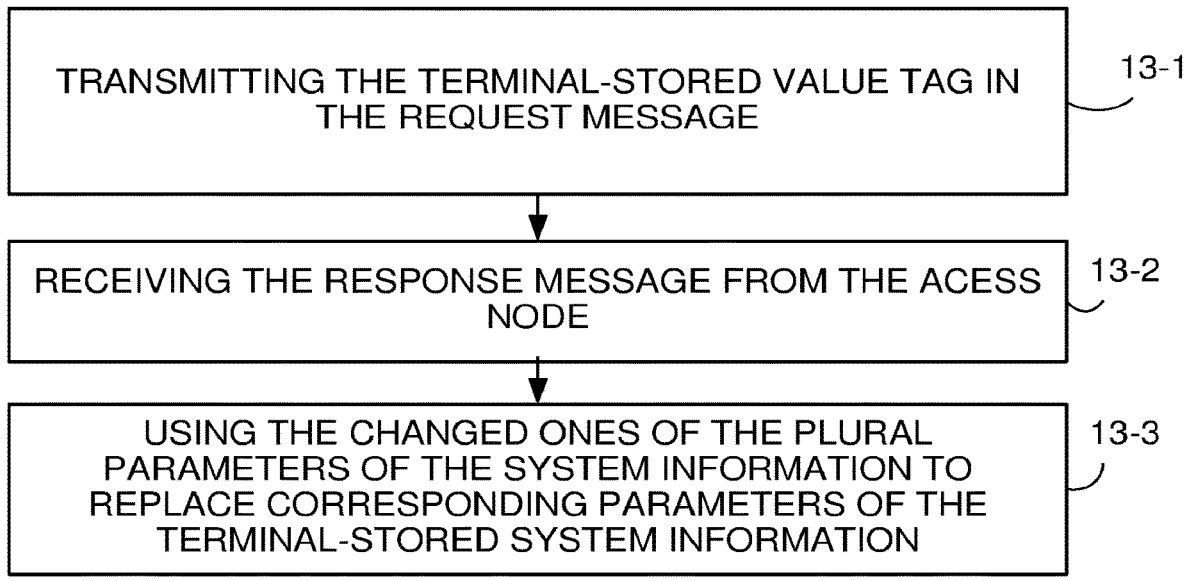
FIG. 13 is a flowchart showing example, representative, basic acts or steps performed by the wireless terminal of FIG. 10 in implementing certain acts of FIG. 11.

Basic example acts performed by wireless terminal 26 in conjunction with the example embodiment and mode of FIG. 10 and FIG. 11 are shown in FIG. 13. Act 13-1 comprises the wireless terminal 26 transmitting the terminal-stored value tag in the request message (e.g., in message 11-4). Act 13-2 comprises the wireless terminal 26 receiving the response message (e.g., message 11-5) from the access node. As mentioned above, the response message includes changed ones of the plural parameters based on a comparison at the access node of the node-reported value tag relative to the terminal-stored value tag. Act 13-3 comprises the wireless terminal 26 using the changed ones of the plural parameters of the system information to replace corresponding parameters of the terminal-stored system information.

In the above regard, the wireless terminal 26 may construct the entire SIB # n using the received compressed content and the content of SIB # n saved in its memory. In the example described above, the wireless terminal 26 may overwrite saved p3 and p7 with the ones received in the compressed content. The UE further updates the saved value tag for SIB # n to valueTag=m.

In typical deployments, the content of system information is stable and even if it has some updates those updates are generally minor. By the approach described in the example embodiment of FIG. 10 and FIG. 11, it is possible to reduce the data size of the Non-essential System Information Response message.

Figure 14:
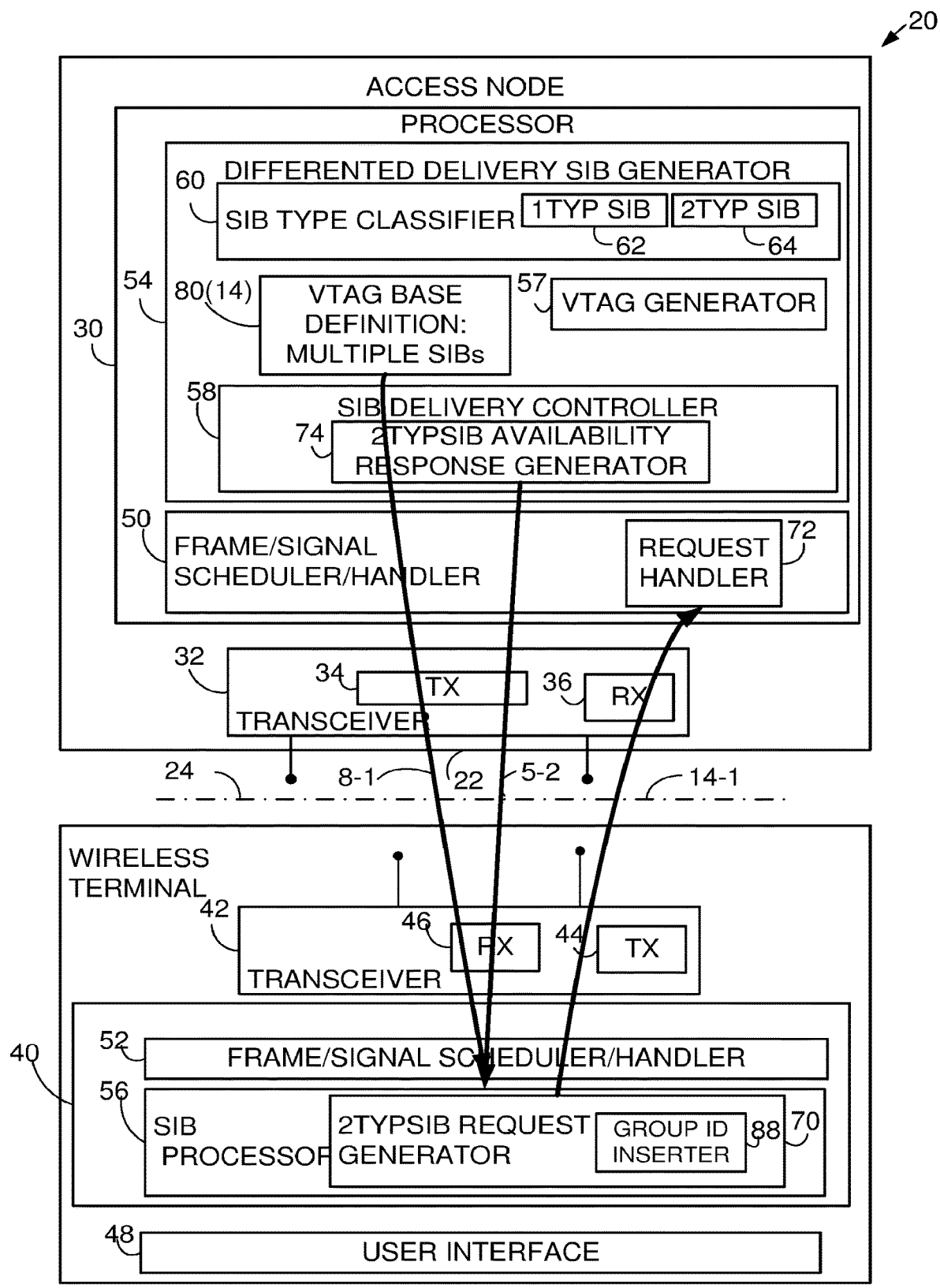
FIG. 14 is a schematic view showing an example communications system comprising a radio access node and a wireless terminal, and wherein the radio access node provides a value tag which is associated with a group of plural system information blocks (SIBs).

The example embodiment and mode of FIG. 14 is similar to the embodiment and mode of FIG. 8, but differs in that a value tag may represent a value or version for an aggregation of multiple non-essential SIBs, e.g., a group of second type system information blocks. In particular, the value tag base definition 80(14) of the embodiment and mode of FIG. 14 defines multiple sibIds associated with one valueTag to thereby form a non-essential or second type system information SIB "group". Thus, in the FIG. 14 embodiment and mode, the node processor 30 generates the value tag to be associated with a group of plural second type system information blocks. The 2TYP SIG request generator 70 of the wireless terminal 26 of FIG. 14 includes a group identifier inserter ("group ID inserter 88") which includes, in a request message 14-1, an identification of the group of second type system information blocks which are the subject of a second type system information request. The request message 14-1 also may include a value tag associated with the group.

Figure 15:
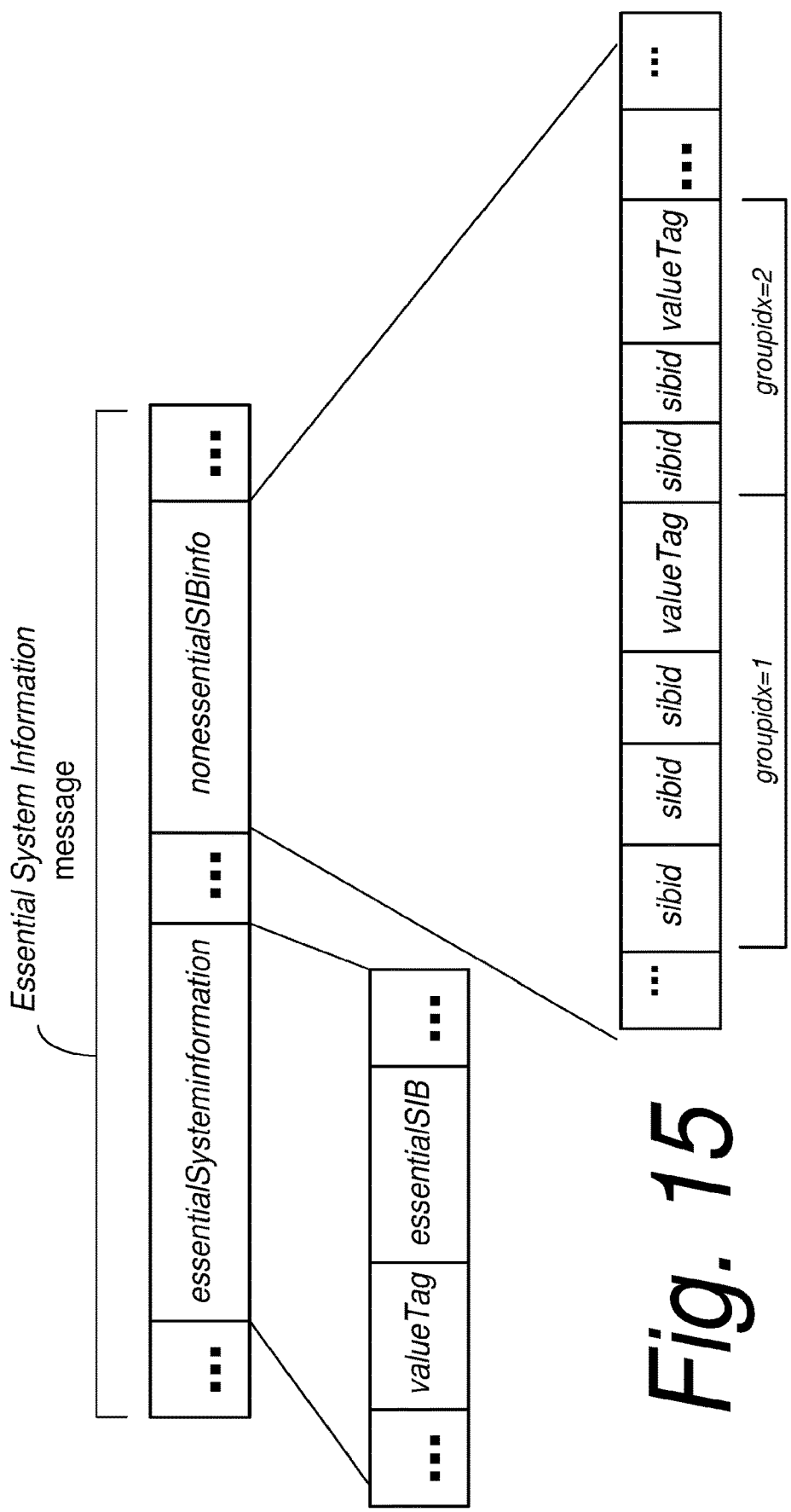
FIG. 15 is a diagrammatic view showing an example format of an Essential System Information message according to an example implementation of the system of FIG. 14, wherein multiple sibIds associated with one valueTag forms a non-essential SIB group.

FIG. 15 shows an exemplary format of the Essential System Information message, where multiple sibIds associated with one valueTag forms a non-essential SIB group. The valueTag in each non-essential SIB group of this message is updated when the content of at least one non-essential SIB belonging to this group changes. In one configuration, each non-essential SIB group may be associated with groupIdx, an index of the group in the order of occurrence in the nonEssentialSIBInfo.

Figure 16:
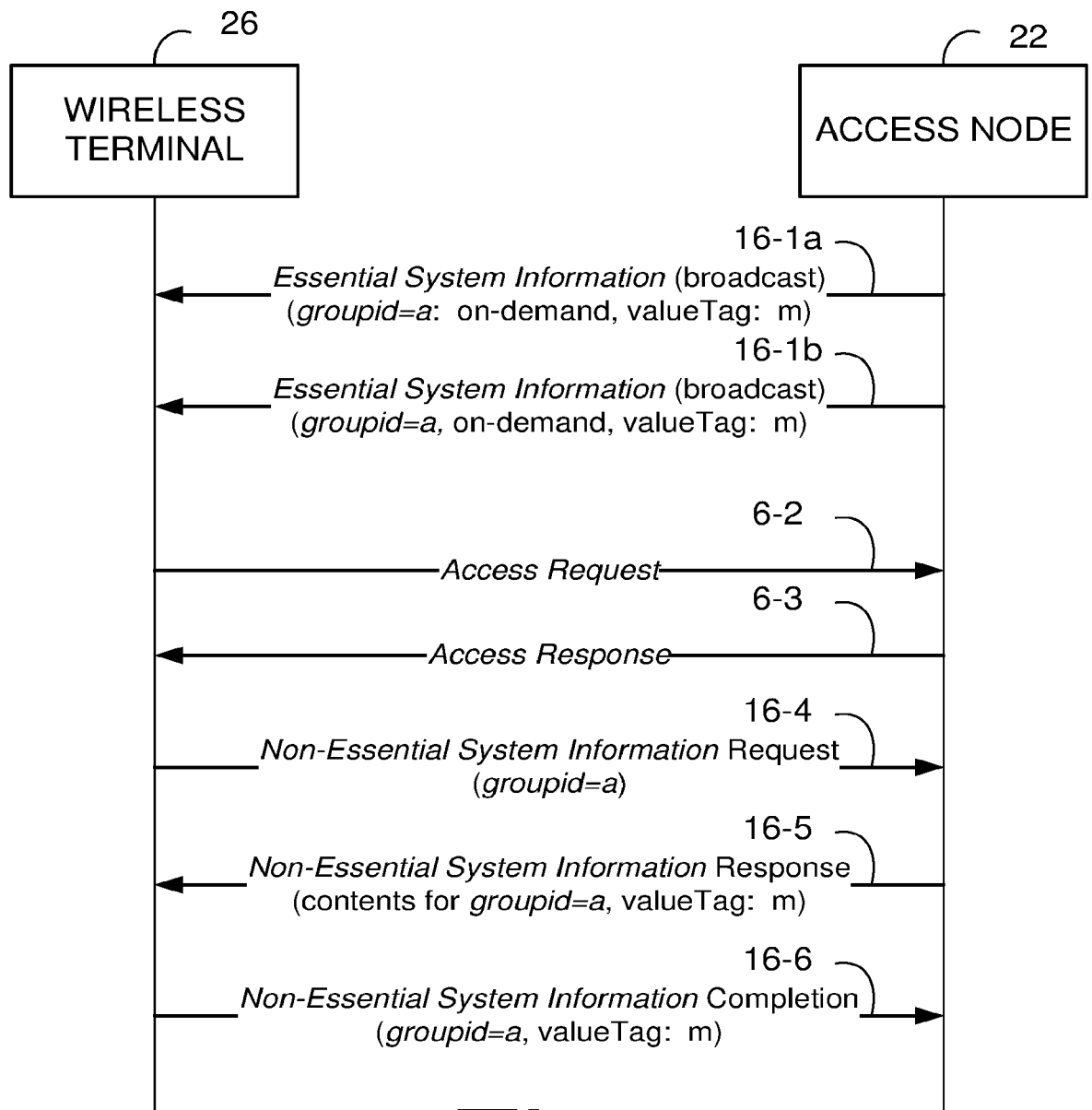
FIG. 16 is a diagrammatic view showing example message flow for the example communications system of FIG. 14.

FIG. 16 illustrates an example message flow for the embodiment and mode of FIG. 14. FIG. 14 particular shows Essential System Information messages 16-1a and 16-1b as advertising a non-essential SIB group with groupIdx=a and valueTag=m. The wireless terminal 26, when requesting the contents of the non-essential SIBs belonging to the group, sends to radio access node 22 the Non-essential System Information Request message 16-4 containing groupId=a. In response, the radio access node 22 sends Non-essential System Information Response message 16-4 including the contents of all the non-essential SIBs of the group defined by groupid=a.

Figure 17:
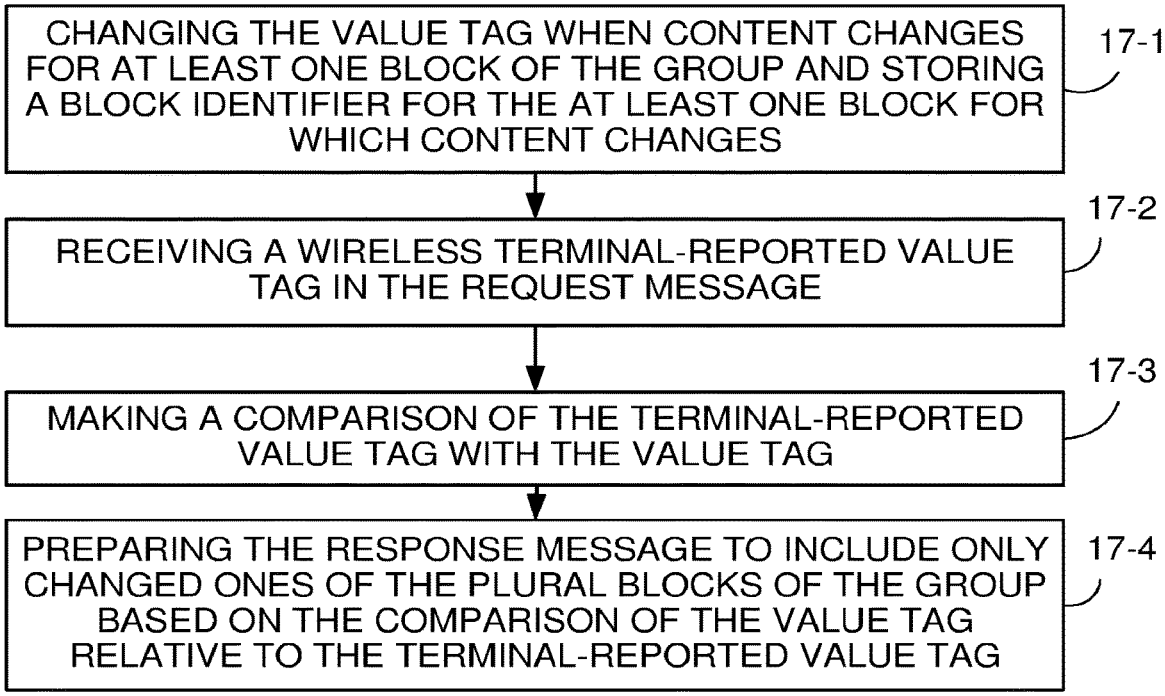
FIG. 17 is a flowchart showing example, representative, basic acts or steps performed by the radio access node of FIG. 14 in implementing certain acts of FIG. 16.

As explained above, the example embodiment and mode of FIG. 14 and FIG. 16 involves, e.g., generating the value tag to be associated with a group of plural second type system information blocks. Basic example acts performed by radio access node 22 in conjunction with the example embodiment and mode of FIG. 14 and FIG. 16 are shown in FIG. 17. Act 17-1 comprises changing the value tag when content changes for at least one block of the group and storing a block identifier for the at least one block for which content changes. Act 17-2 comprises receiving a wireless terminal-reported value tag in the request message. Act 17-3 comprises making a comparison of the terminal-reported value tag with the value tag. Act 17-4 comprises preparing the response message to include only changed ones of the plural blocks of the group based on the comparison of the value tag relative to the terminal-reported value tag.

Figure 18:
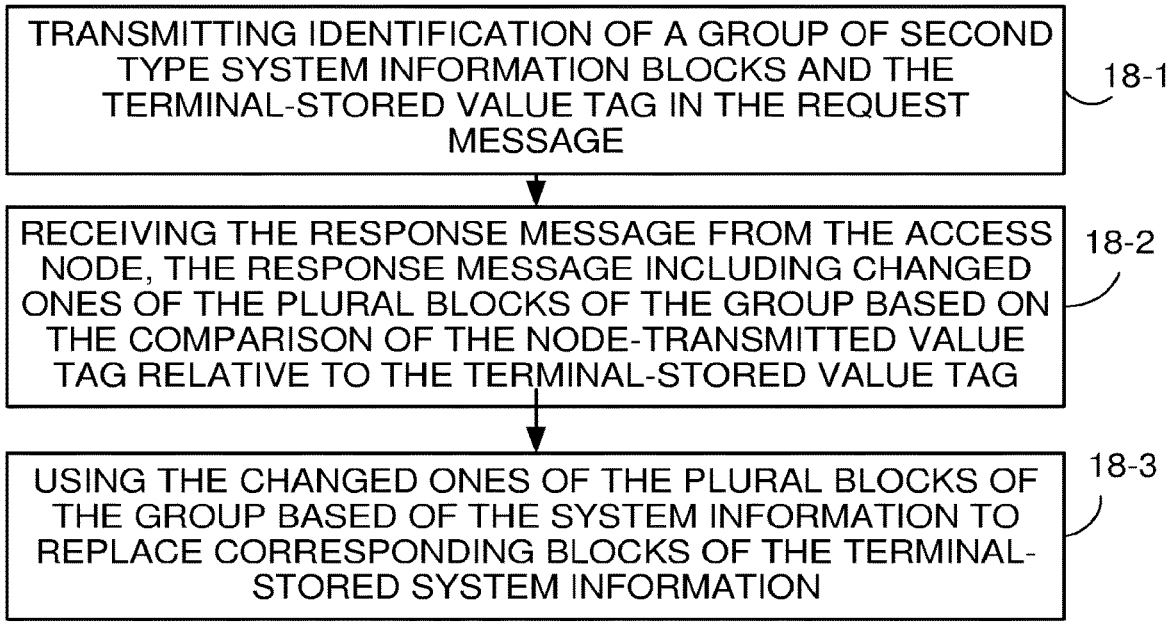
FIG. 18 is a flowchart showing example, representative, basic acts or steps performed by the wireless terminal of FIG. 14 in implementing certain acts of FIG. 16.

Basic example acts performed by wireless terminal 26 in conjunction with the example embodiment and mode of FIG. 14 and FIG. 16 are shown in FIG. 18. Act 18-1 comprises transmitting an identification of a group of second type system information blocks and the associated value tag in the request message (e.g., in message 16-4 of FIG. 16). Act 18-2 comprises receiving the response message (e.g., message 16-5 of FIG. 16) from the access node, the response message including changed ones of the plural blocks of the group based on the comparison of the node-transmitted value tag relative to the terminal-stored value tag. Act 18-3 comprises using the changed ones of the plural blocks of the group based of the system information to replace corresponding blocks of the terminal-stored system information.

Figure 19:
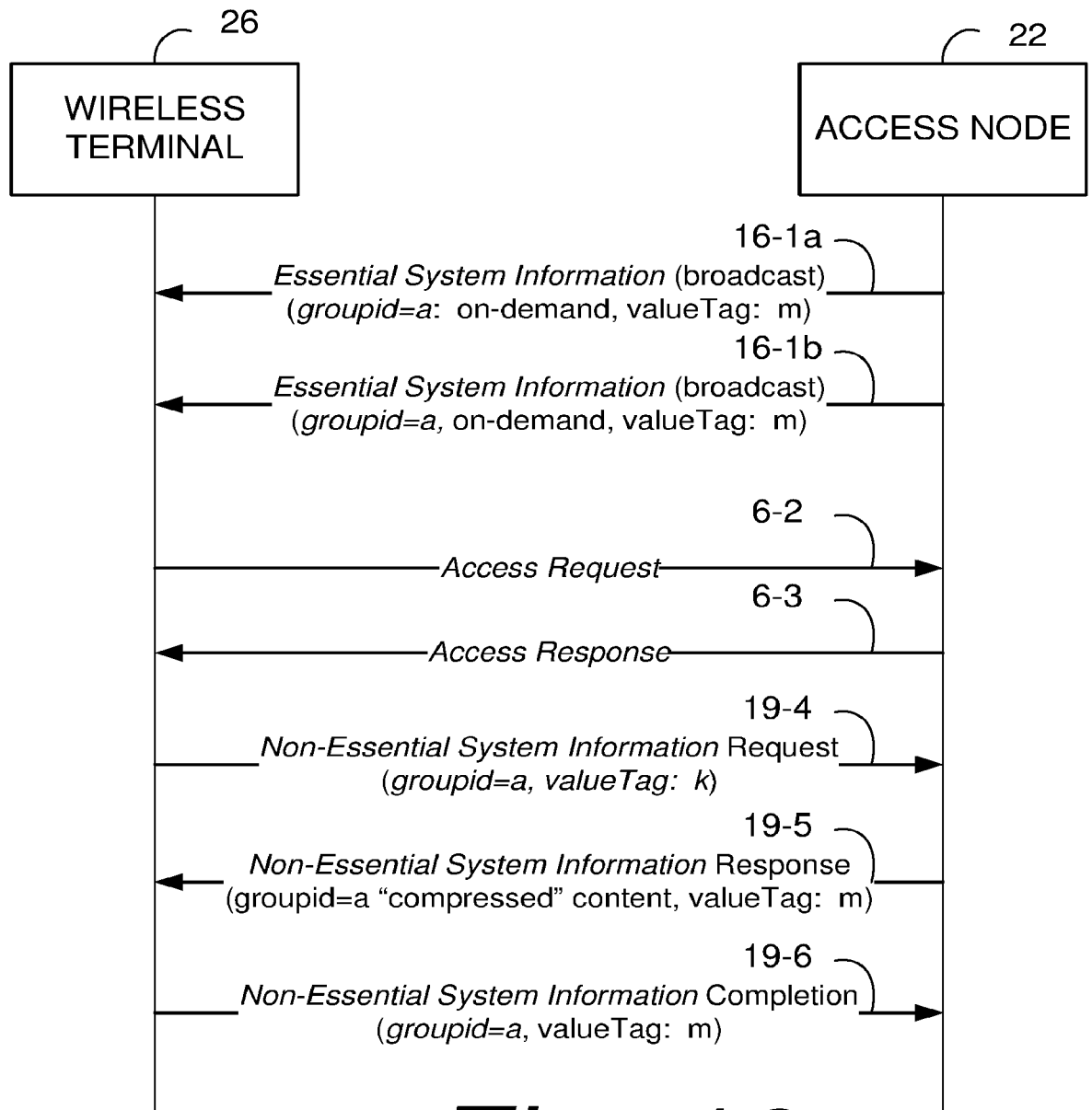
FIG. 19 is a diagrammatic view showing example message flow for another example embodiment and mode which combines features of the embodiment and mode of FIG. 10 and the embodiment and mode of FIG. 14.

Another example embodiment and mode, having message flow represented by FIG. 19, is based on the combination of the content compression method disclosed in the embodiment of FIG. 10 and the concept of non-essential SIB group described in the embodiment of FIG. 14. In the message flow of FIG. 19, the wireless terminal 26 sends Non-essential System Information Request message 19-4 with groupIdx=a, since the value tag that UE saves for this non-essential SIB group is not current. The Non-essential System Information Response message 19-5 that the radio access node 22 sends in response contains compressed content of the non-essential SIB group. In one implementation, the compressed content comprises the differences between the current non-essential SIBs (value Tag=m) and the previously broadcasted non-essential SIBs (valueTag=k) under the same non-essential SIB group.

Figure 20:
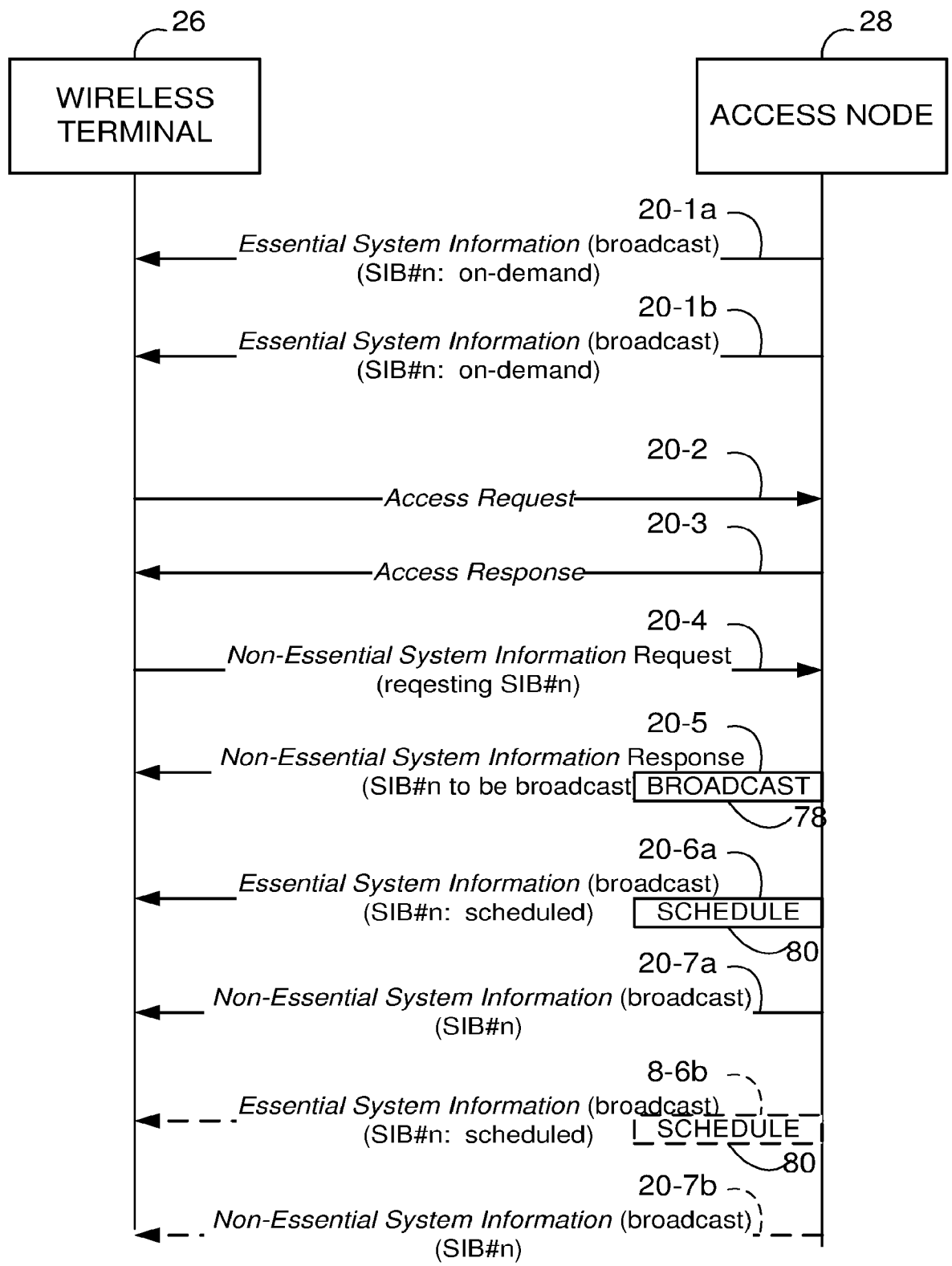
FIG. 20 is a diagrammatic views showing an example message flow for yet other example embodiments and modes.

FIG. 20 illustrates another signaling message flow for another example embodiment and mode. The initial messages of FIG. 20 are similar to those of some preceding embodiments and modes, but in FIG. 20 the Non-essential System Information Response message 20-5 includes an information element 78 indicating that the requested SIB # n will be broadcasted instead of unicasted. The radio access node 22, at a subsequent cycle of an Essential System Information message transmission (e.g., at message 20-6a), starts including at least one information element (such as information element 80) for the scheduling information of SIB # n transmissions. Based on this scheduling information, the radio access node 22 broadcasts the Non-essential System Information message 20-7a containing the requested SIB # n. As indicated by the messages depicted in broken lines in FIG. 20, the radio access node 22 may repeat these two steps multiple times for reliable delivery. By receiving at least one of these repetitions, the wireless terminal 26 should successfully obtain the SIB # n. The number of the repetitions may be determined by the radio access node 22, and information indicating the number may be broadcasted together with the essential system information. Alternatively, the number of the repetitions may be determined by the wireless terminal 26 and may be notified to the radio access node 22 through the Non-essential System Information Request message 20-4.

Figure 21:
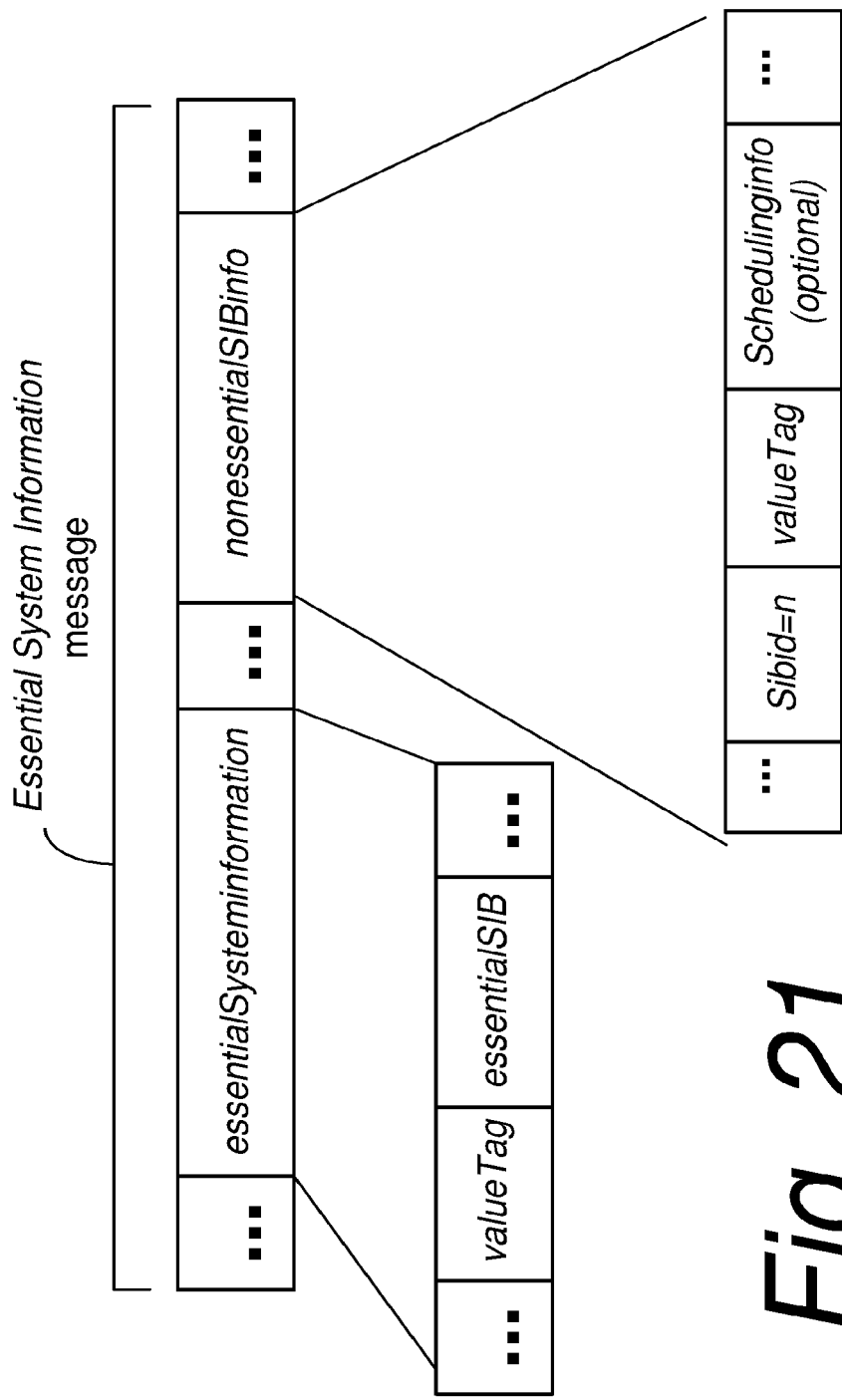
FIG. 21 is a diagrammatic view showing an example format of an Essential System Information message according to an example implementation of the system of FIG. 20.

In some implementations of the example embodiment and mode of FIG. 20 the access node 22 may include a value tag(s) in messages, such as in the Essential System Information message(s) 20-6 of FIG. 20. Likewise, in some example implementations the broadcasted Non-essential System Information message(s) 20-7 may comprise a value tag that represents the version of the non-essential SIB(s) delivered by the Non-essential System Information message(s). In this regard, FIG. 21 shows one exemplary format of the Essential System Information with the scheduling information, where the SchedulingInfo optional information element is used for indicating the broadcast schedules for Non-essential System Information message with the updated SIB # n content.

A benefit of the FIG. 20 embodiment and mode is that the requested SIB # n may also be received by other wireless terminals entering the same coverage area. Such wireless terminals may receive the Essential System Information message 20-6 and know that the SIB # n is scheduled to be transmitted. As a result, the number of transmissions for Non-essential System Information Request message 20-4 may be reduced. An additional benefit is that the transmissions of messages 20-2 and 20-3 may also be reduced.

Figure 22:
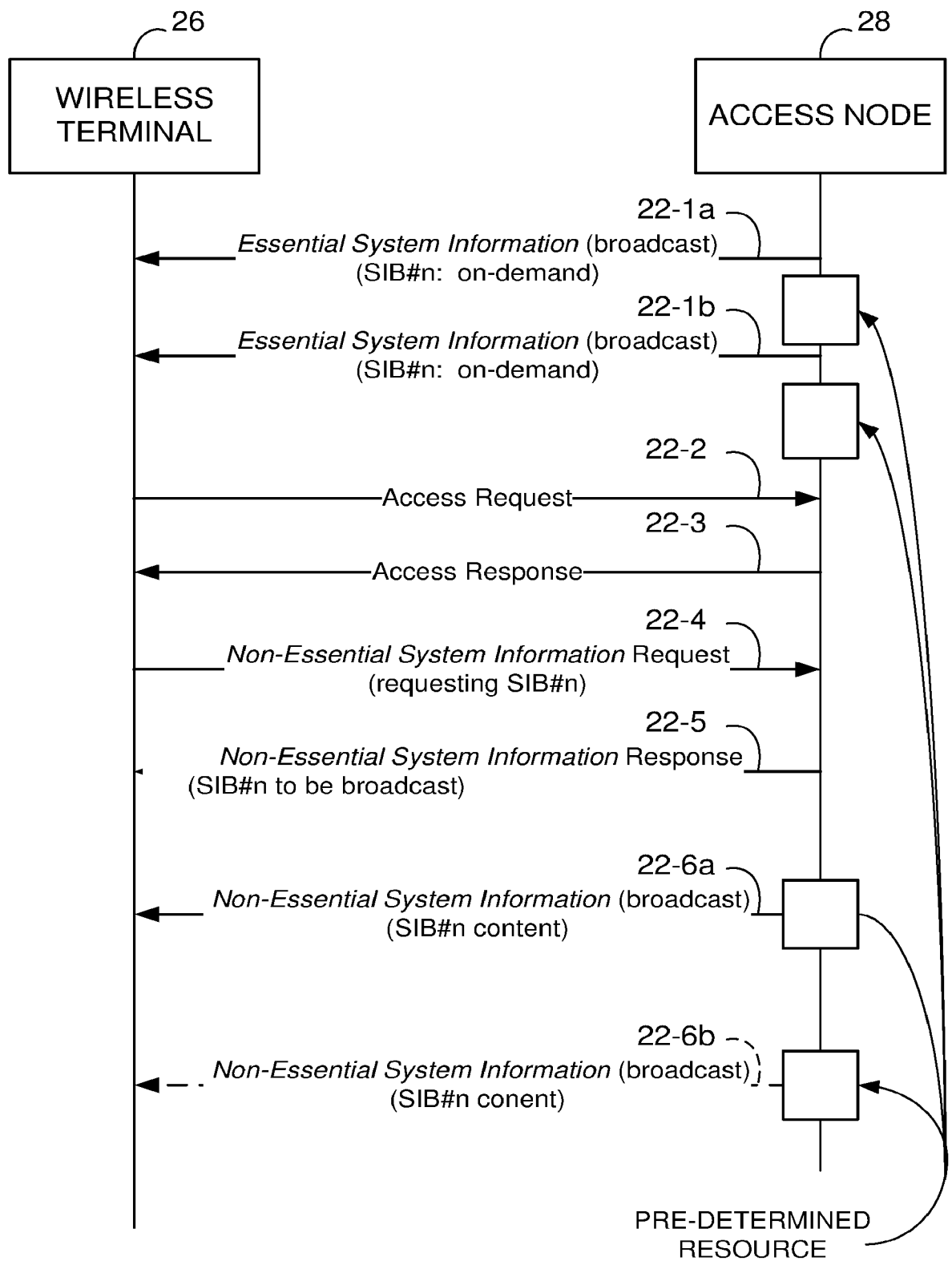
FIG. 22-FIG. 25 are diagrammatic views showing example message flows for still yet other example embodiments and modes.

FIG. 22 illustrates yet another signaling message flow for another example embodiment and mode. The initial messages of FIG. 22 are similar to those of some preceding embodiments and modes, but in FIG. 22 the broadcasts of SIB # n in the Non-essential System Information message(s) 22-6 occur on pre-determined resource allocations. For example, the pre-determined resource allocations may be defined by using a periodicity and/or an offset. The radio access node 22 may optionally repeat sending Non-essential System Information messages 22-6 at multiple occasions. The wireless terminal 26 that has sent a Non-essential System Information Request message 22-4, requesting the SIB # n, may receive Non-essential System Information on at least one pre-determined radio resource allocation, without receiving an Essential System Information message. The radio access node 22 may use these allocated resources for other purposes if it does not transmit SIB # n.

In the FIG. 22 embodiment and mode, any other wireless terminal entering the coverage first receives the Essential System Information message 22-1, then it may monitor pre-determined resources for several times before sending Non-essential System Information Request message 22-4, in order to suppress unnecessary transmissions of Non-essential System Information Request message. The number of monitoring trials may be pre-determined, or may be configured by the Essential System Information message.

In addition, in the FIG. 22 embodiment and mode the pre-determined resource allocations can be configurable by including the information of allocations in Essential System Information message 22-1. The pre-determined resource allocations of a given non-essential SIB may be jointly coded with whether the non-essential SIB is available at this radio access node by request. Alternatively, the pre-determined resource allocations may be tied to the SIB indices.

Figure 23:
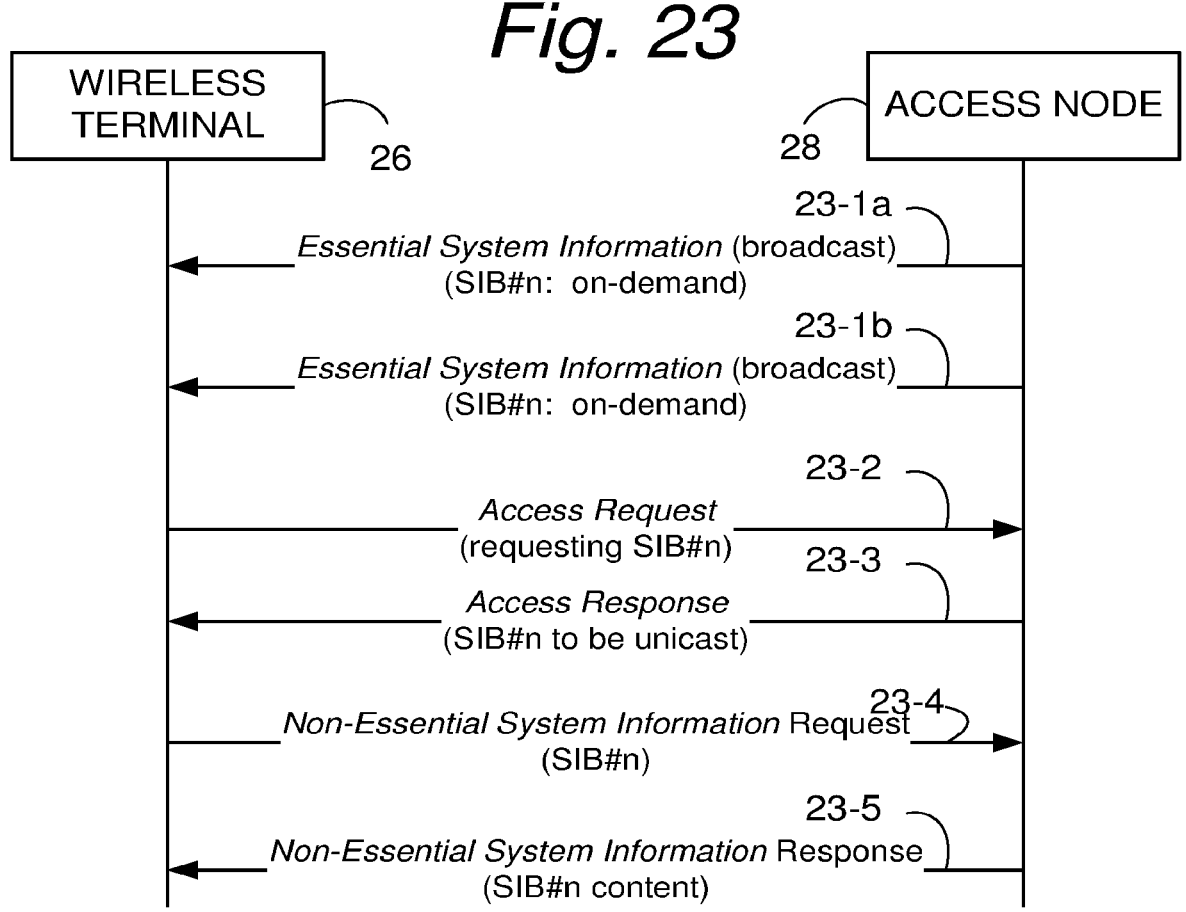
Figure 24:
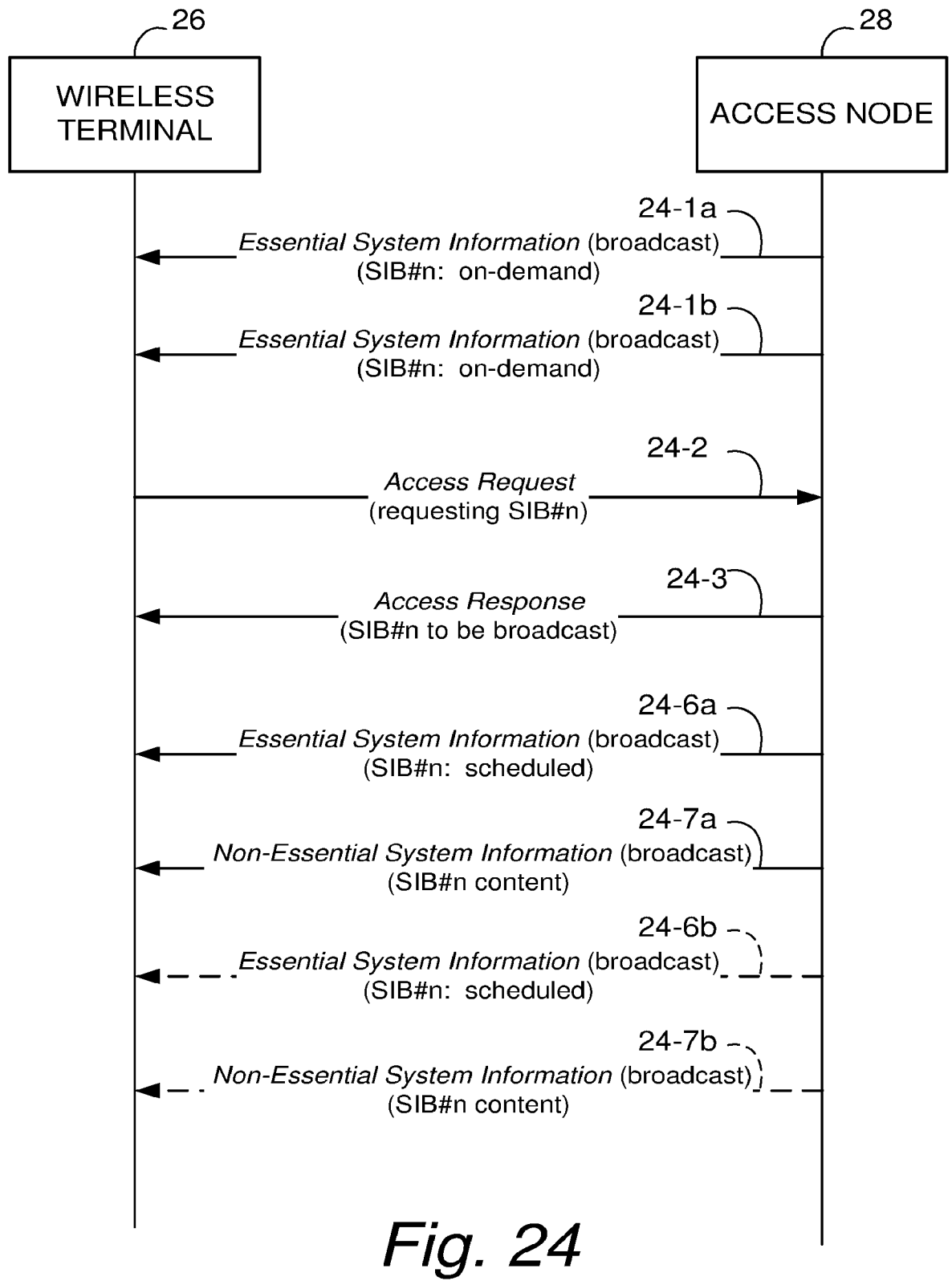
Figure 25:
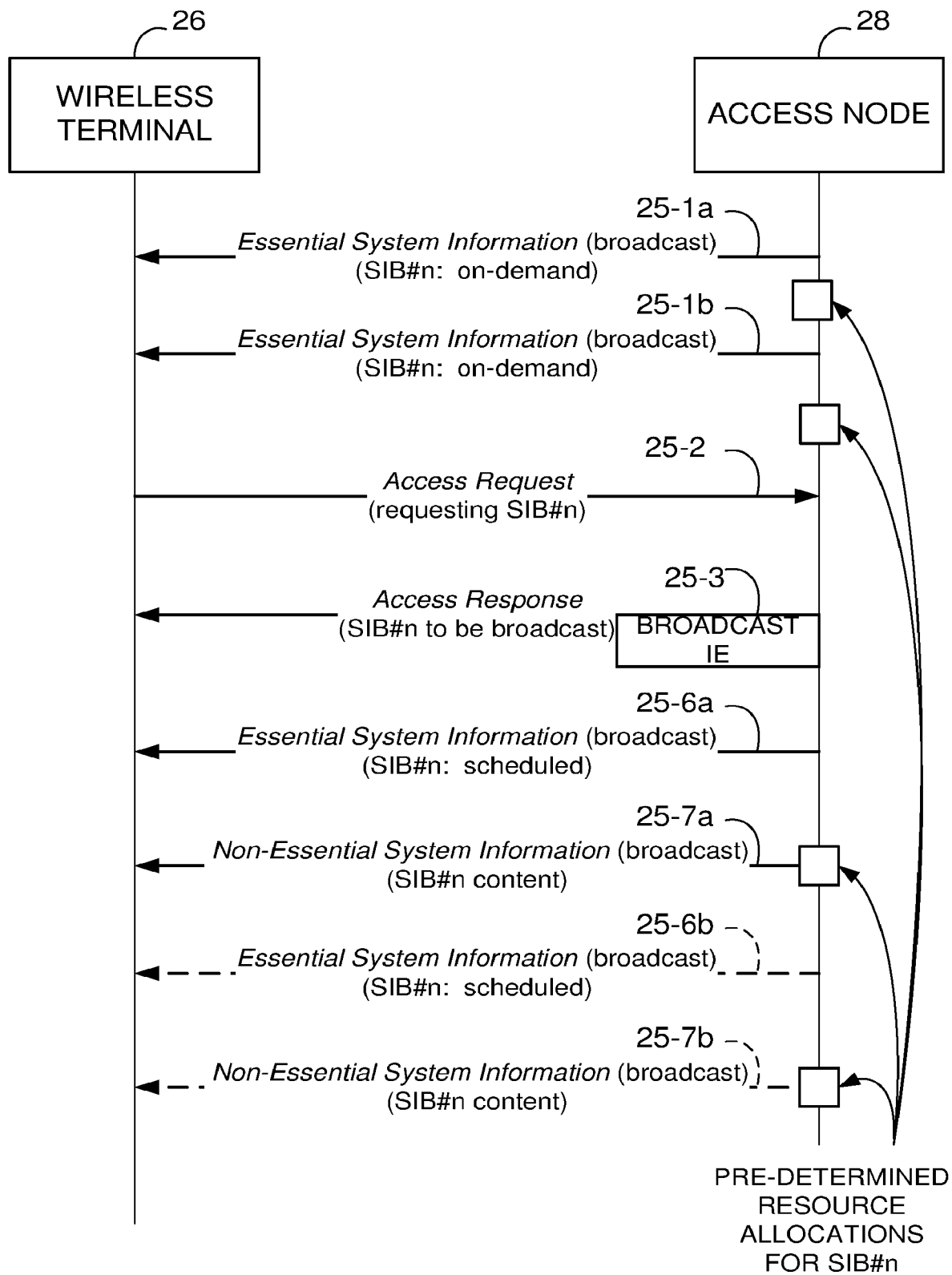

FIG. 23 illustrates yet another signaling message flow for another example embodiment and mode. In FIG. 23, the Access Request message(s) 23-2 now contain(s) a request for the SIB # n broadcast. The radio access node that receives the request may decide to deliver the SIB # n by unicast, or by broadcast. In case of unicast, it includes an information element of unicast indication for SIB # n in Access Response message 23-3, as shown in FIG. 23. Otherwise, the radio access node includes an information element of a broadcast indication for SIB # n in Access Response message 24-3, as shown in FIG. 24. An alternative approach to FIG. 24 is shown in FIG. 25, where Non-essential System Information message 25-5 is broadcasted on pre-determined resource allocations.

Further information regarding the technology disclosed herein, including but not limited to the example embodiments and modes of FIG. 20-FIG. 25, is provided in related US Provisional Application 62/367,447, entitled "ON-DEMAND SYSTEM INFORMATION FOR WIRELESS TELECOMMUNICATIONS", filed on Jul. 27, 2016.

In certain example embodiments and modes described above, if the access node 22 updates the content of a non-essential SIB, a new value of the value tag for the SIB will be used, e.g., in the Essential System Information message. In one example implementation, the value tag may be incremented (e.g., incremented by one). The wireless terminals under the coverage of the access node 22 may (1) eventually receive the message with the new value tag, (2) find out that the previously received SIB becomes obsolete, and (3) decide to send a Non-essential System Information Request message to the access node 22.

Figure 26:
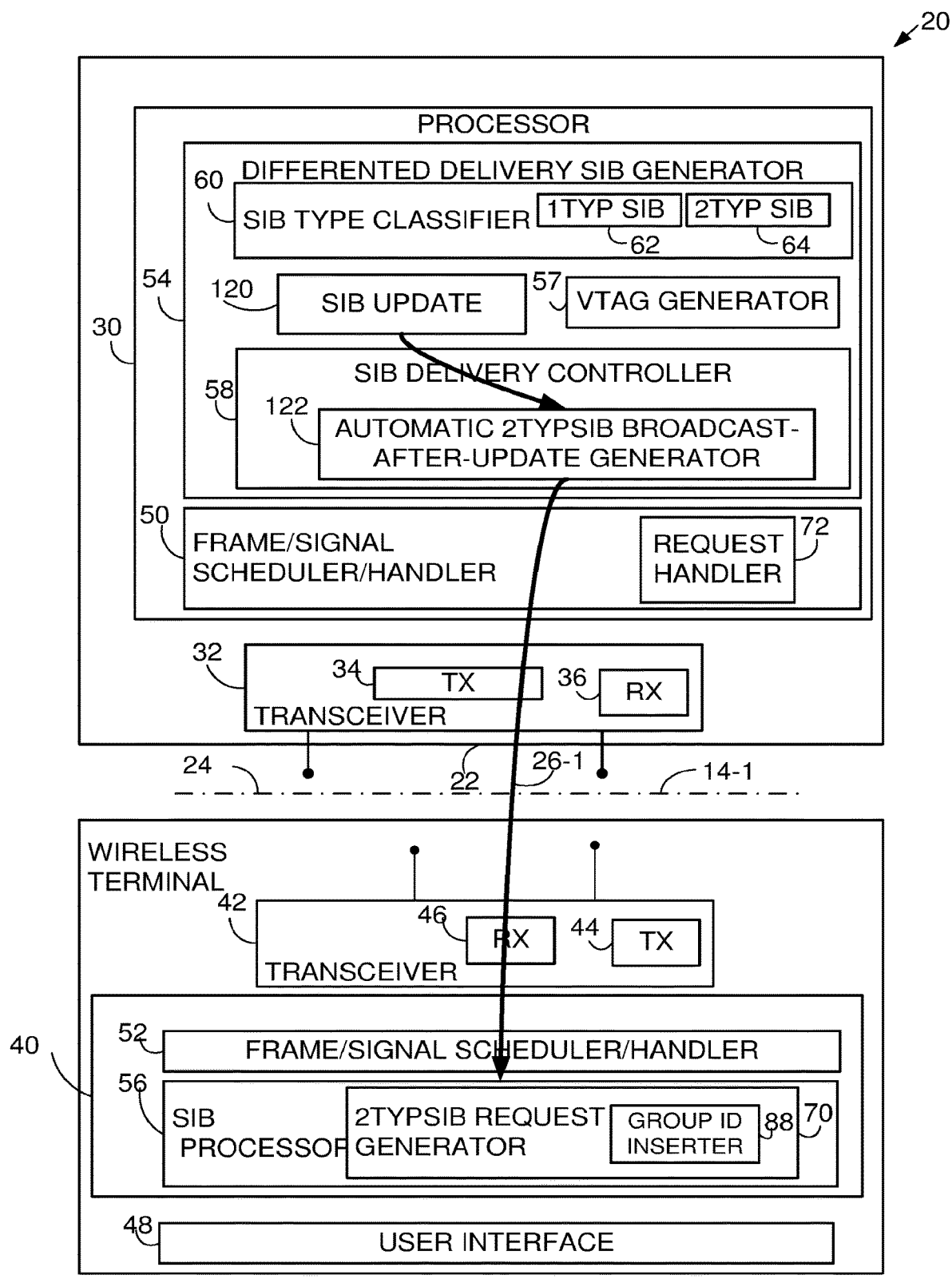
FIG. 26 is a schematic view showing an example communications system comprising a radio access node and a wireless terminal, and wherein the radio access node provides an automatic broadcast-after-update for system information.

FIG. 26 illustrates certain example embodiments and modes which seek to avoid congestion that may occur if many Non-essential System Information Request messages are transmitted from wireless terminals. In particular, the example embodiment and mode of FIG. 26 allows the access node 22 to broadcast the new content of the non-essential SIB for limited times after the SIB update. The broadcast-after-update technology of FIG. 26 may be utilized in conjunction/combination with any other of the example embodiments and modes described herein.

FIG. 26 shows node processor 30, and SIB generator 54 in particular, as comprising SIB update functionality 120. The SIB update functionality 120 either updates/changes the second type system information or detects an update or change in the second type system information. The SIB delivery controller 58 comprises automatic second type system information broadcast-after-update generator 122.

Whenever there is an update or other change for the second type system information as performed or detected by the SIB update functionality 120, the automatic second type system information broadcast-after-update generator 122 generates broadcast messages 26-1 including the new/updated content of the second type system information. The broadcast messages 26-1 including the new content of the second type system information continue only for a limited time, or a predetermined number of automatic-after-update broadcast messages.

Figure 27:
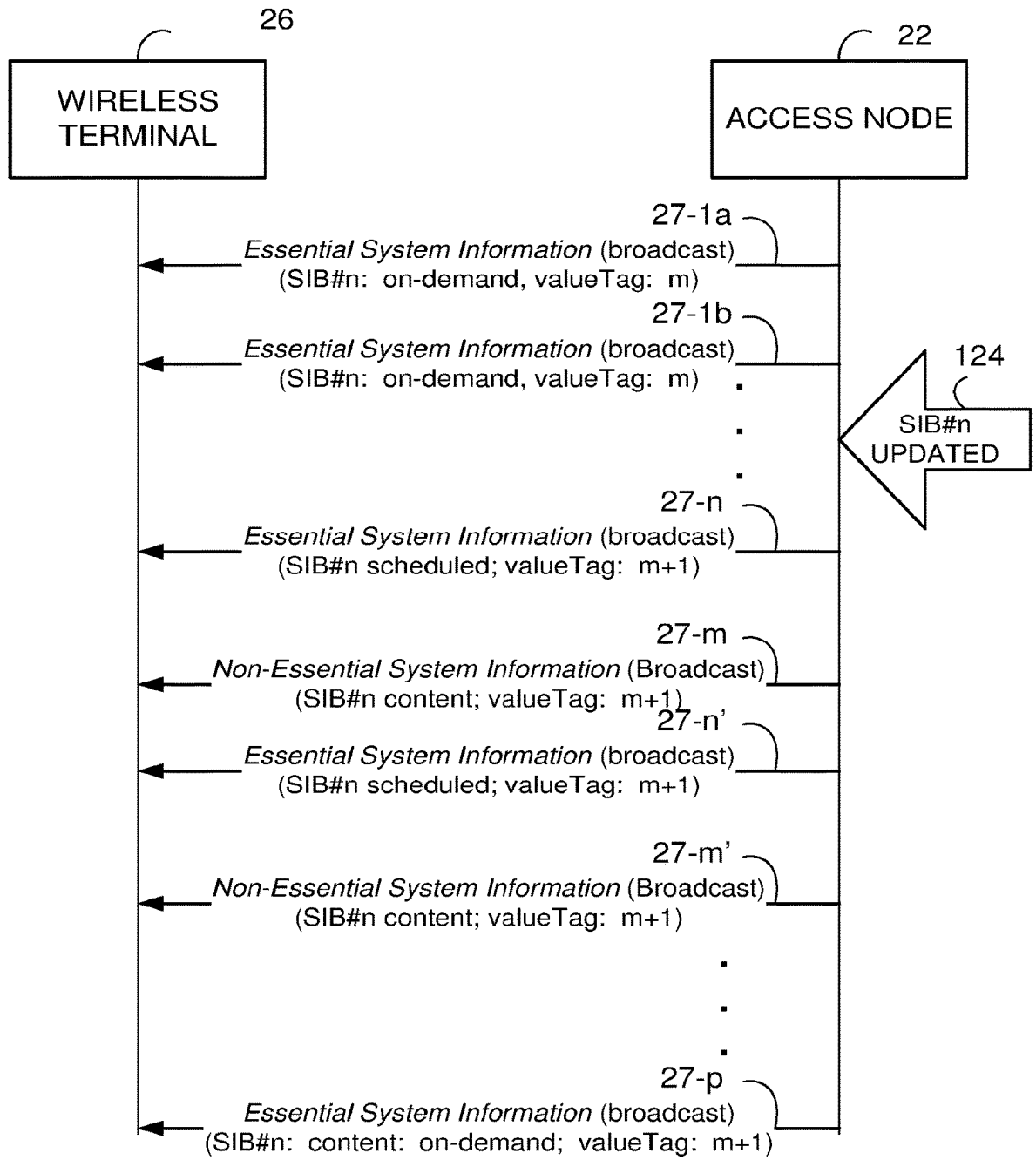
FIG. 27 is a diagrammatic view showing example message flow for the example communications system of FIG. 16.

FIG. 27 illustrates a message flow for an example scenario of the example embodiment and mode of FIG. 26. In the example scenario of FIG. 27, as shown by arrow 124 SIB # n gets updated (e.g., by SIB update functionality 120) and its value tag changes from m to m+1. From this moment the access node 22 starts including the new value tag m+1 for SIB # n in the Essential System Information message(s) 27-n. In addition, at least one transmission of the Essential System Information message(s) 27-n after the SIB # n update may include scheduling information to indicate one or plurality of broadcast schedules for the updated SIB # n content. Based on the scheduling information, the access node 22 broadcasts Non-essential System Information message(s) 27-m including the updated SIB # n content. As indicated by the primed message suffixes in FIG. 27, the access node 22 may optionally transmit Essential System Information message(s) with the scheduling information and the Non-essential System Information message(s) with the SIB # n content multiple times, e.g., for a predetermined time period after the SIB # n update, for example. As further shown in FIG. 27, after the automatic broadcast-after-update messages 27-n and 27-m, the access node 22 may also broadcast the fact that the SIB # n update is available on demand, as indicated by message 27-p.

In the example embodiment and mode of FIG. 26 and FIG. 27, the access node 22 may use the message format shown in FIG. 21 for the Essential System Information message with the scheduling information. The wireless terminals receiving this Essential System Information message may attempt to receive the scheduled Non-essential System Information message, instead of requesting on-demand delivery of the updated SIB # n. Once the scheduled broadcasts of the updated SIB # n content are completed, the wireless terminal may no longer use the optional information element.

Some communication systems may employ discontinuous reception (DRX), where the wireless terminals do not always monitor the periodic transmission of the Essential System Information message. In order to ensure that the wireless terminals under the coverage of the access node receive the automatic broadcast-after-update messages, the system in some implementations may use a separate signaling mechanism to trigger the reception of the Essential System Information message. One example is that the access node includes an indication in the Paging message for predetermined duration before transmitting the Essential System Information message 27-n.

Figure 28:
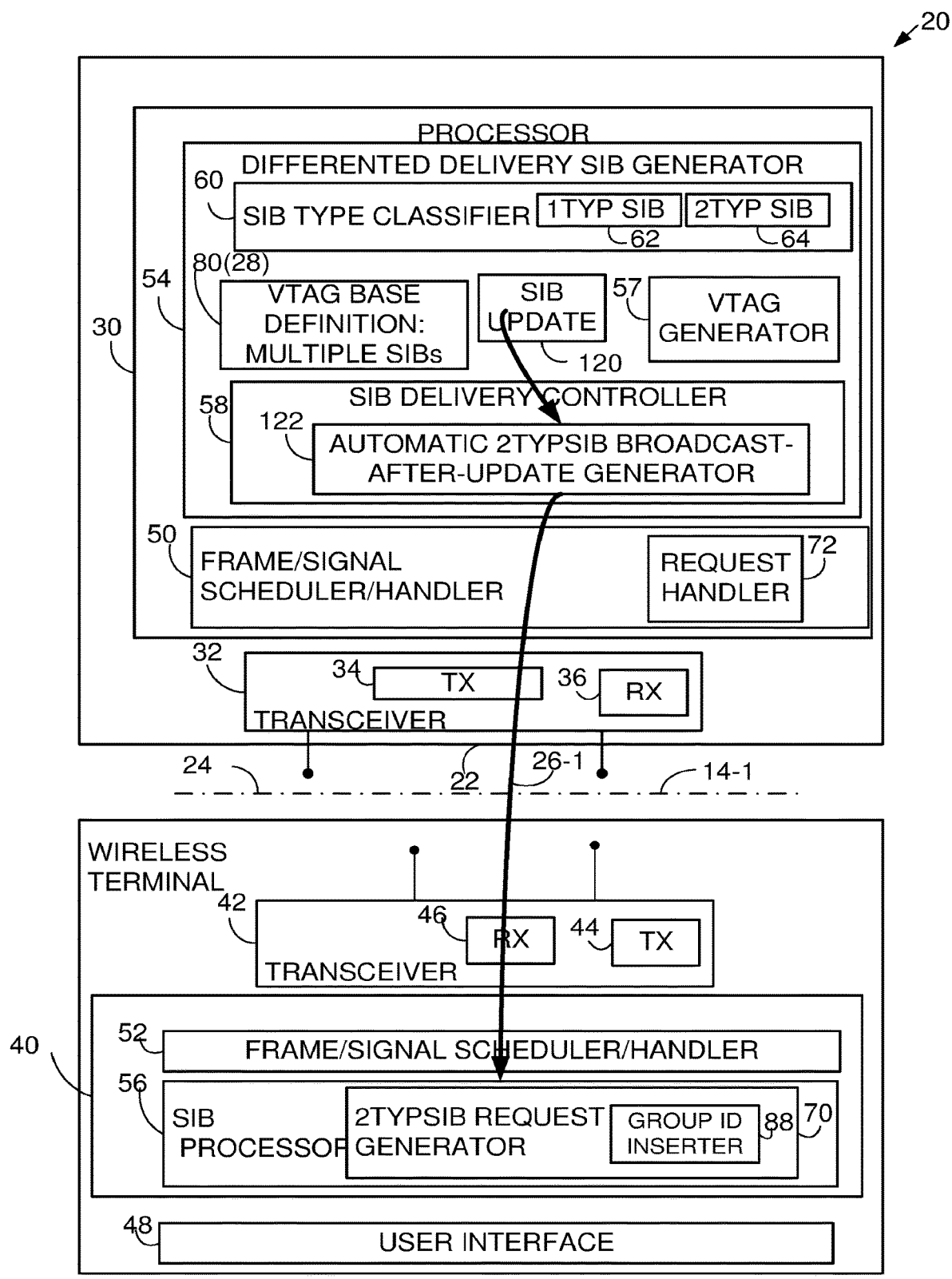
FIG. 28 is a schematic view showing an example communications system comprising a radio access node and a wireless terminal, and wherein the radio access node provides an automatic broadcast-after-update for system information for a group of second type system information blocks.

The example embodiment and mode of FIG. 28 is based at least in part on the example embodiment and mode of FIG. 26 and at least in part on the example embodiment and mode of FIG. 14 wherein the access node 22 may employ the concept of non-essential SIB groups. In the FIG. 28 example embodiment and mode, the Non-essential System Information message which is automatically broadcasted after the SIB content update includes the contents of multiple SIBs grouped with the same value tag.

FIG. 28 shows the node processor 30 and the SIB generator 54 in particular as comprising not only the SIB update functionality 120 and the automatic second type system information broadcast-after-update generator 122, but also a value tag base definition logic 80(28) which defines multiple SIB groups associated with the value tag.

Figure 29:
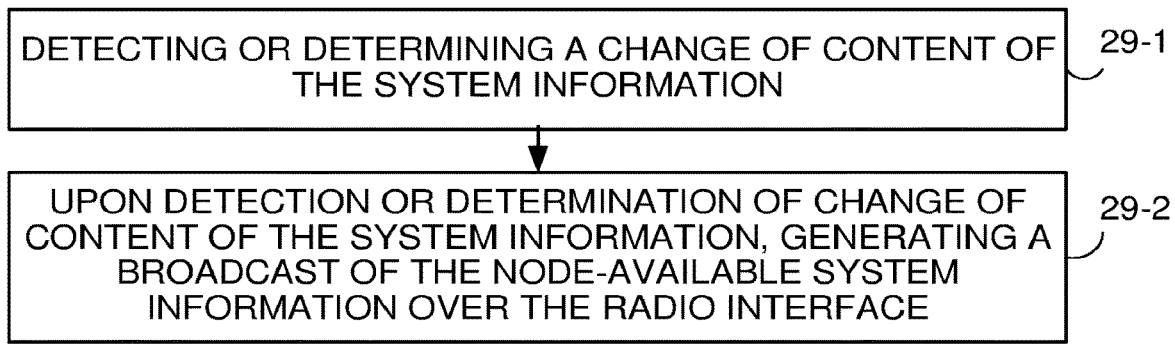
FIG. 29 is a flowchart showing example, representative, basic acts or steps performed by the radio access node of FIG. 28.

FIG. 29 shows example, representative, basic acts or steps performed by the radio access node 22 of FIG. 28. Act 29-1 comprises detecting or determining a change of content of the system information. Act 29-2 comprises, upon the detection or the determination of change of content of the system information, generating a broadcast of the updated system information over the radio interface. In the example embodiment and mode of FIG. 29, the change of content may be an update of the system information, and the changed or updated system information may in particular be second type system information. Moreover, the broadcast may be broadcast messages which are scheduled, with scheduling information for such broadcast being included in previous broadcast such as a node-available system information message. Such previous broadcast message may be, in at least some embodiments, can be an Essential System Information broadcast message. Moreover, in example implementation, the broadcast of the second type system information over the radio interface may occur only for a predetermined time, e.g., a predetermined number of such broadcasts.

Figure 30:
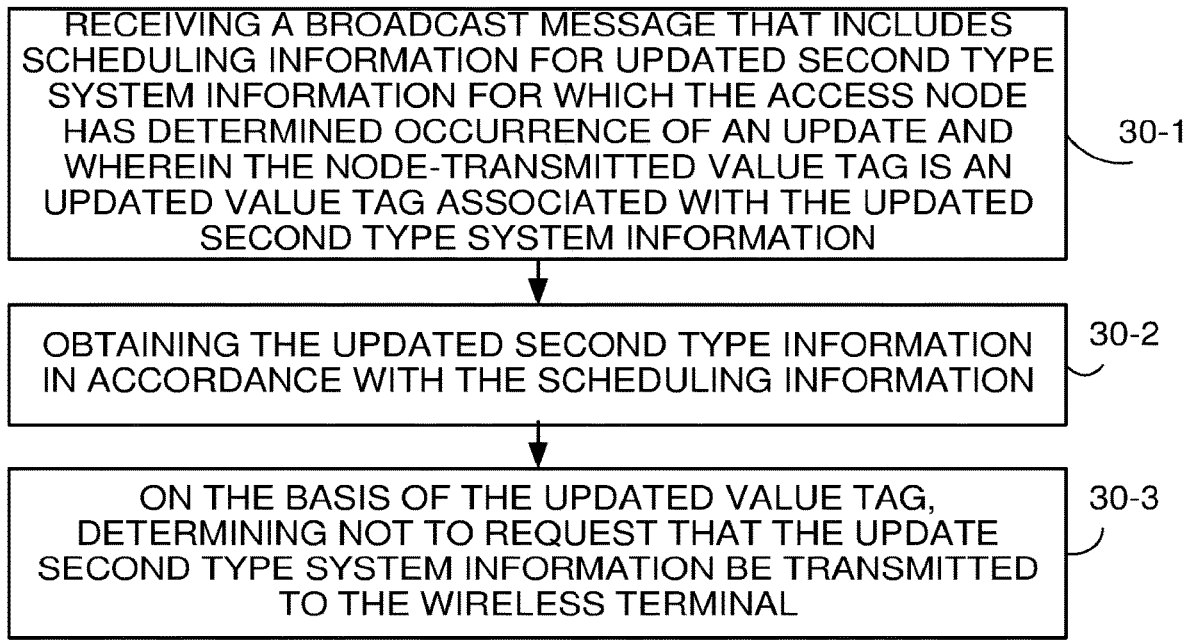
FIG. 30 is a flowchart showing example, representative, basic acts or steps performed by the wireless terminal of FIG. 28.

FIG. 30 shows example, representative, basic acts or steps performed by the wireless terminal 26 of FIG. 28. Act 30-1 comprises receiving a broadcast message that includes scheduling information for updated second type system information for which the access node has determined occurrence of an update and wherein the node-transmitted value tag is an updated value tag associated with the updated second type system information. Act 30-2 comprises obtaining the updated second type information in accordance with the scheduling information. Act 30-3 comprises, on the basis of the updated value tag, determining not to request that the update second type system information be transmitted to the wireless terminal.

Figure 31:
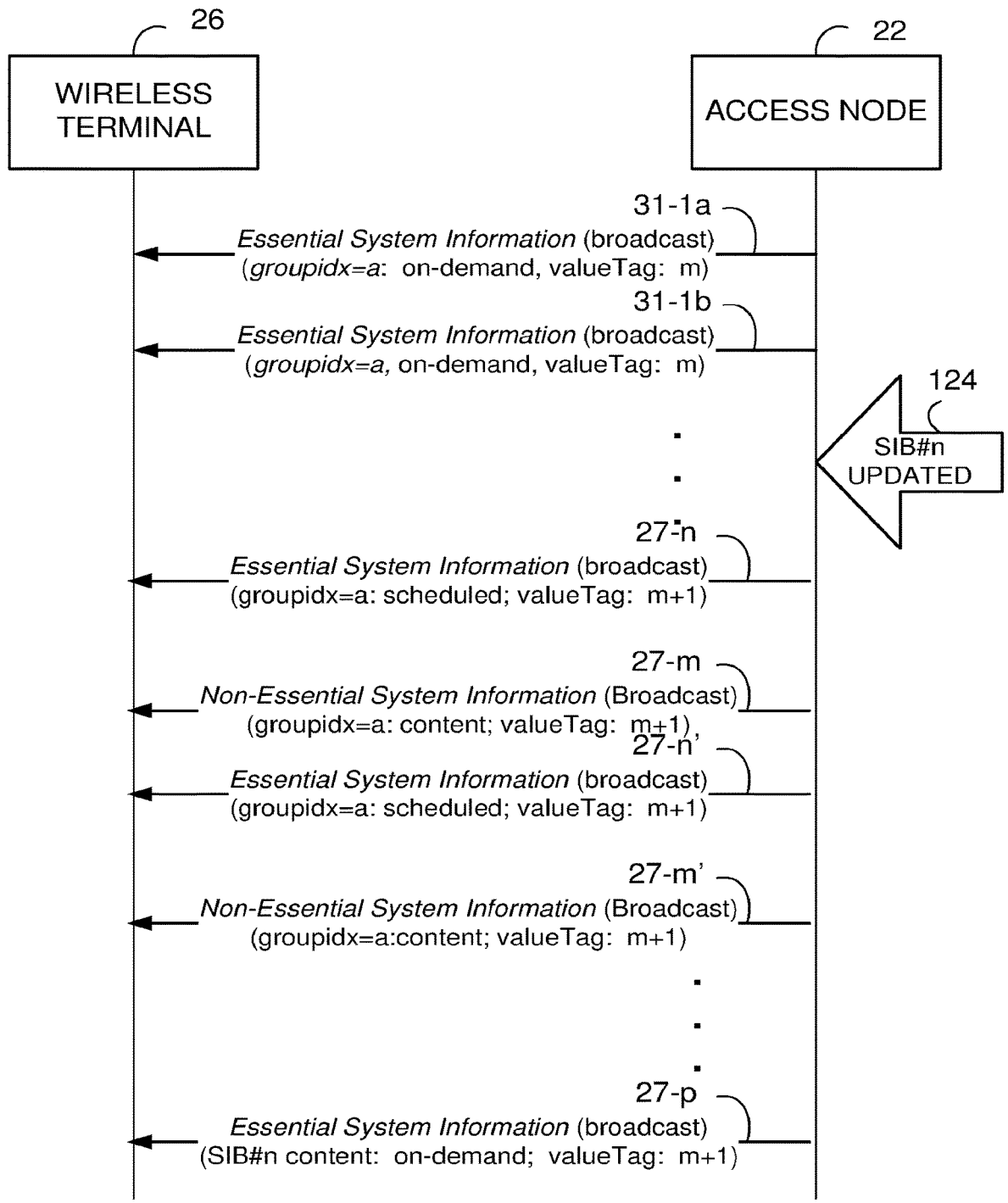
FIG. 31 is a diagrammatic view showing example message flow for the example communications system of FIG. 28.
Figure 32:
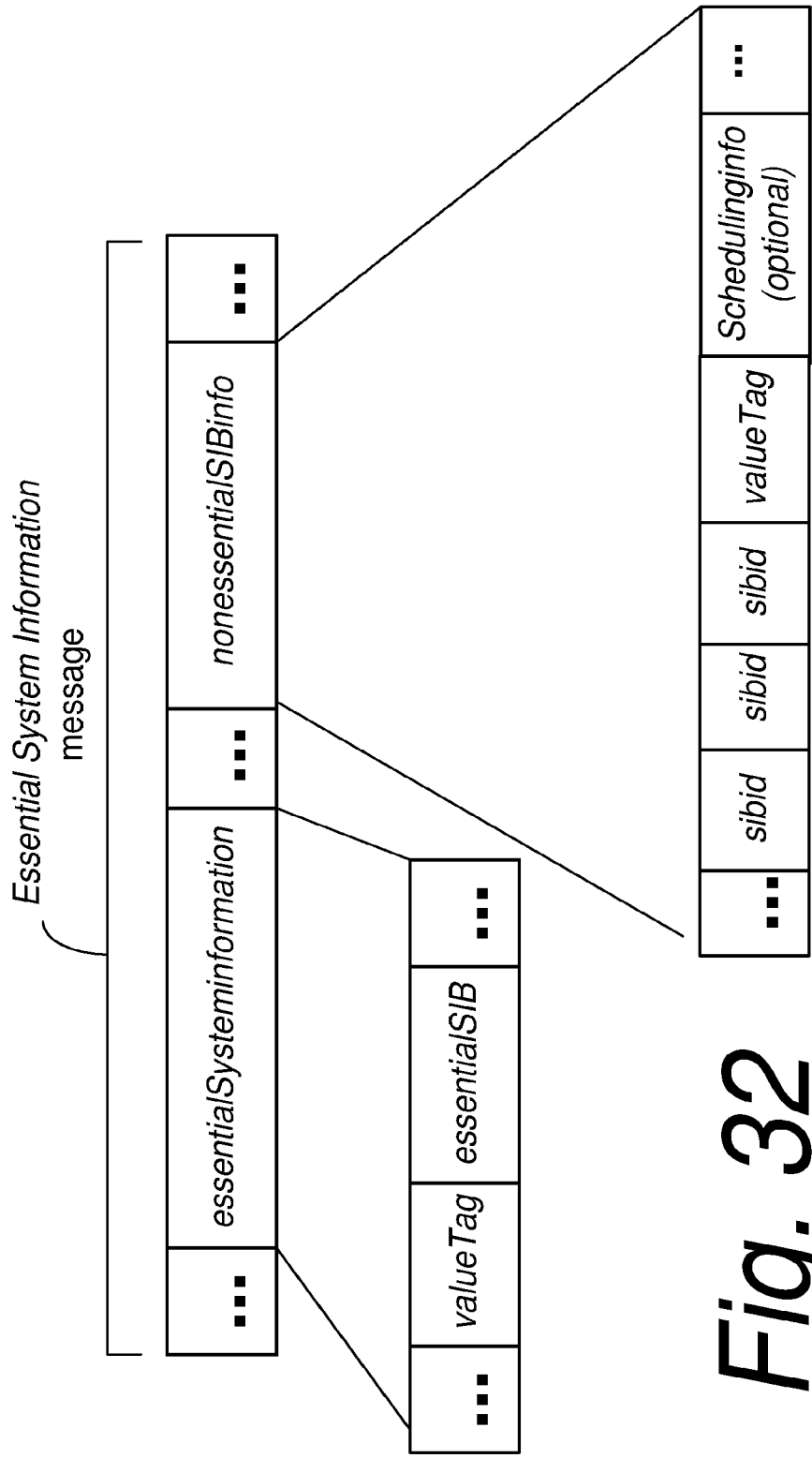
FIG. 32 is a diagrammatic view showing an example format of an Essential System Information message according to an example implementation of the system of FIG. 28.

FIG. 31 shows an example of message flow for the example embodiment and mode of FIG. 28; FIG. 32 shows an example message format of the Essential System Information message for example embodiment and mode of FIG. 27 and FIG. 28.

Figure 33:
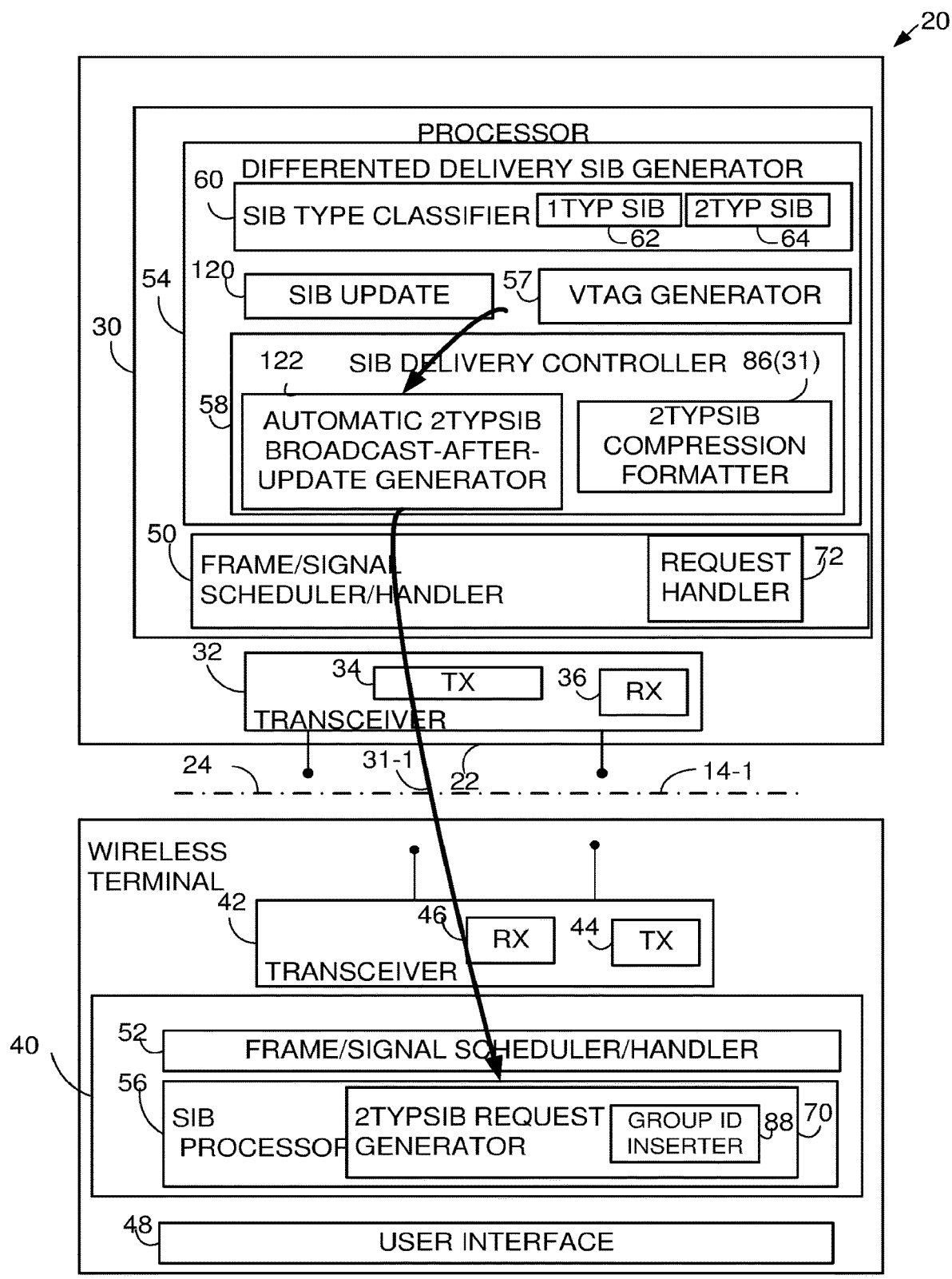
FIG. 33 is a schematic view showing an example communications system comprising a radio access node and a wireless terminal, and wherein the radio access node provides a compressed automatic broadcast-after-update message for second type system information blocks.

FIG. 33 illustrates certain example embodiments and modes which allow the access node 22 to broadcast a "compressed" image of updated non-essential system information in conjunction with the automatic broadcast-after-update feature. The node processor 30 of access node 22, and the SIB generator 54 in particular, comprise both the SIB update functionality 120 and automatic second type system information broadcast-after-update generator 122, as well as 2TYPSIB compression formatter 86(31). Upon actual update or detection of update of system information by functionality 120, the broadcast-after-update generator 122 generates a compressed SIB broadcast-after-update message 33-1, in which compression is achieved by virtue of 2TYPSIB compression formatter 86(31) preferably including in the SIB broadcast-after-update message 33-1 only those system information parameters of the SIB block which have changed.

Figure 34:
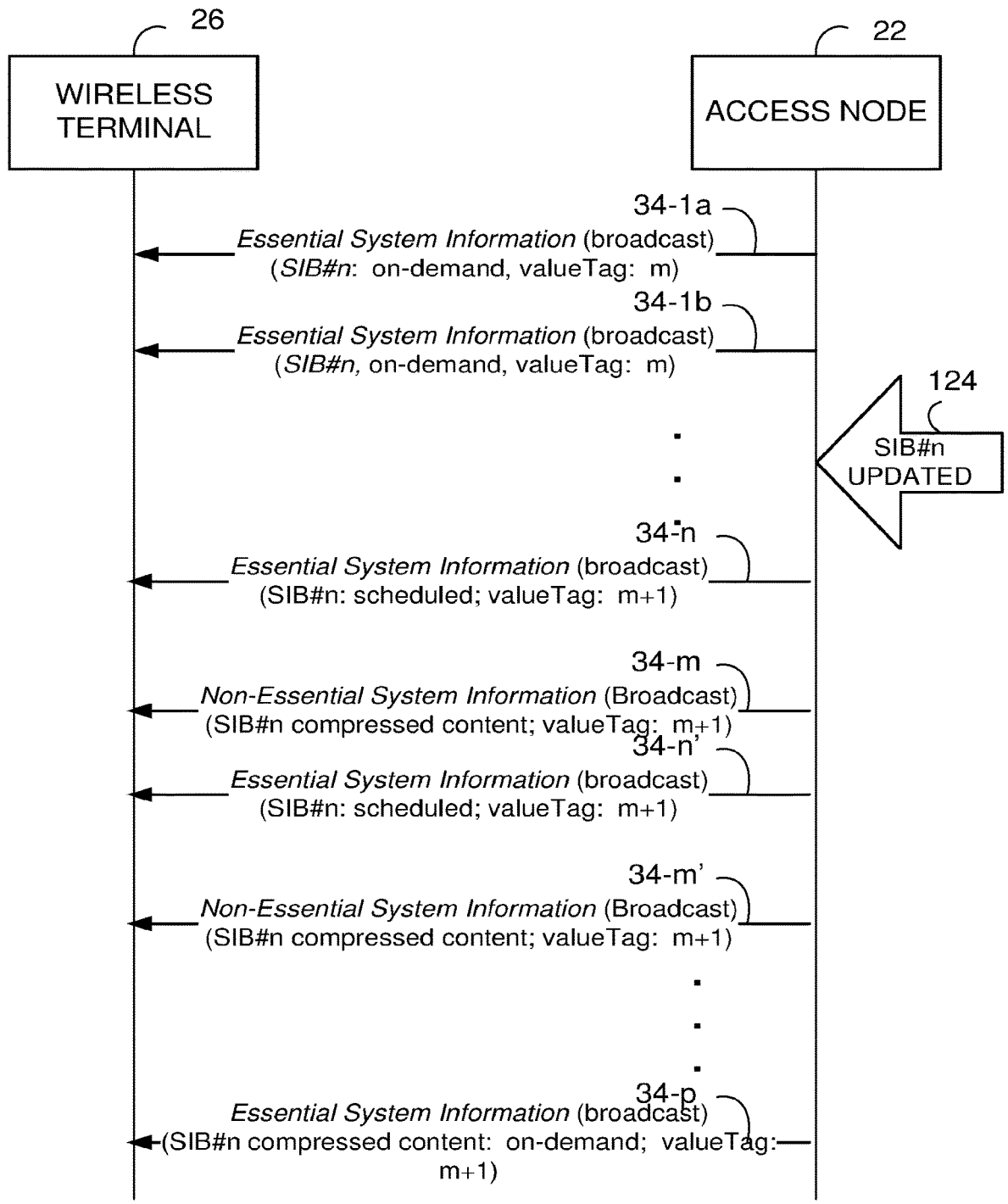
FIG. 34 is a diagrammatic view showing example message flow for the example communications system of FIG. 33.

FIG. 34 shows an exemplary message flow for the embodiment and mode of FIG. 33. In FIG. 32, the broadcasted Non-essential System Information message(s) 34-*n* now include(s) a compressed content of the updated SIB # n with valueTag=m+1. As described in a previous embodiment and mode, in one implementation the compressed content comprises the differences between the updated SIB # n (valueTag=m+1) and the previously transmitted (valueTag=m).

The wireless terminal 26 which receives the broadcasted Non-essential System Information message 34-*n* with the compressed SIB # n content with valueTag=m+1 checks if it has previously received SIB # n with valueTag=m and has saved the content in its memory. If so, the wireless terminal 26 simply applies the received compressed image to the saved content to construct the updated content. Otherwise, the wireless terminal 26 may initiate an on-demand delivery request of the updated SIB # n content using one or some of the methods already disclosed above.

Figure 35:
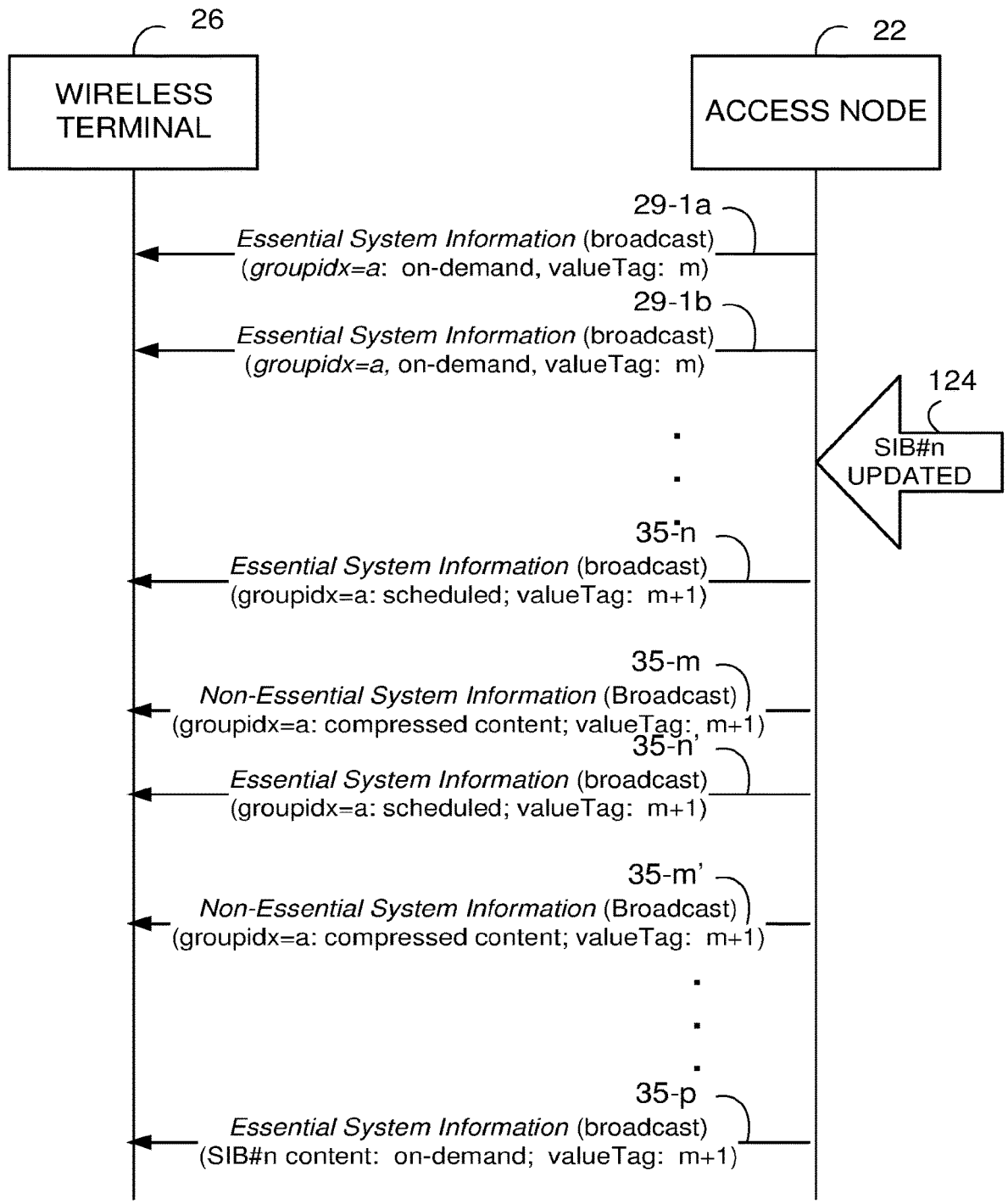
FIG. 35 is a diagrammatic view showing example message flow for an example communications system such as that of FIG. 33 which also uses compression.

FIG. 35 illustrates an example message flow for certain example embodiments and modes which applies the concept of non-essential SIB groups to the example compression embodiment and mode of FIG. 32 in conjunction with the automatic broadcast-after-update feature. In FIG. 35 the Essential System Information message 35-*n* advertises one or more groupIdx's, each of which is associated with a value tag valueTag, as disclosed in a previous example embodiment and mode. Similar to a previous example embodiment and mode, the broadcasted Non-essential System Information message 35-*m* may contain compressed content of the non-essential SIB group. In one implementation, the compressed content comprises the differences between the current non-essential SIBs (valueTag=m+1) and the previously broadcasted (valueTag=m) under the same non-essential SIB group.

Figure 36:
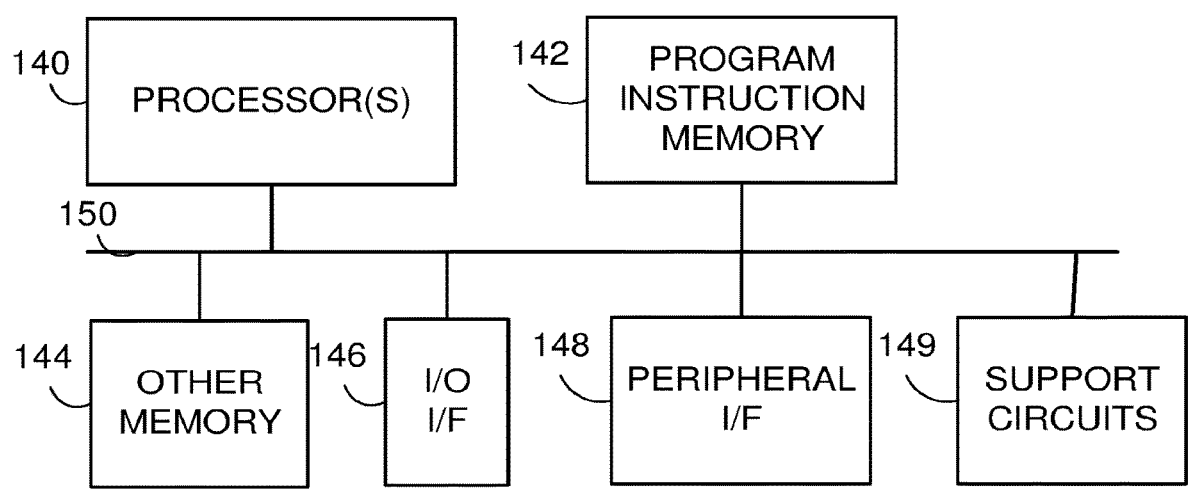
FIG. 36 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 36. FIG. 36 shows an example of such electronic machinery or circuitry, whether node or terminal, as comprising one or more processor(s) circuits 140, program instruction memory 142; other memory 144 (e.g., RAM, cache, etc.); input/output interfaces 146; peripheral interfaces 148; support circuits 149; and busses 150 for communication between the aforementioned units.

The program instruction memory 142 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 144, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 149 are coupled to the processors 140 for supporting the processor in a conventional manner. These circuits include cache, power supplies, clock circuits, input/output circuitry and subsystems, and the like.

The technology of this application thus encompasses but is not limited to the following example embodiments, example features, and example advantages:

Example Embodiment 1

A user equipment (UE) for receiving system information, comprising:
a processor; and
memory in electronic communication with the processor, wherein instructions stored in the memory are executable to:
receive first system information periodically broadcasted from eNB;
determine types of second system information to additionally receive, wherein each of said types corresponds to a second system information block;
transmit to the eNB a request containing said types of the second system information;
receive the requested second system information from the eNB.

Example Embodiment 2

The UE of Example Embodiment 1, wherein contents of one or plurality of second system information blocks are associated with a value tag.

Example Embodiment 3

The UE of Example Embodiment 2, wherein from said first system information the UE obtains value tags, each of which indicates the current version of the corresponding second information system blocks.

Example Embodiment 4

The UE of Example Embodiment 3, wherein the UE retrieves broadcast scheduling information of said second system information from said first system information.

Example Embodiment 5

The UE of Example Embodiment 4, wherein the UE receives the broadcasted second system information based on said scheduling information.

Example Embodiment 6

The UE of Example Embodiment 4, wherein the UE refrains from requesting delivery of second system information blocks if the first system information indicates broadcast delivery of said second system information Example Embodiment 7

The UE of Example Embodiment 6, wherein the UE refrains from requesting delivery of second system information blocks if the first system information indicates broadcast delivery of said second system information and if the current value tag for these second system information blocks is different from the saved value tag for the same second system information blocks.

Example Embodiment 8

The UE of Example Embodiment 4, wherein the second system blocks associated with a same value tag is identified by a group index.

Example Embodiment 9

The UE of Example Embodiment 5, wherein the UE receives one or plurality of compressed contents based on said scheduling information, each of which is a compressed image of one or plurality of second system information blocks.

Example Embodiment 10

An evolved node B (eNB) for delivering system information, comprising:
a processor; and
memory in electronic communication with the processor, wherein instructions stored in the memory are executable to:
periodically broadcast first system information that includes types of second system information available by request, wherein each of said types corresponds to a second system information block;
receive from a UE a request for transmission of said second system information;
transmit said requested second system information.

Example Embodiment 11

The eNB of Example Embodiment 10, wherein contents of one or plurality of second system information blocks are associated with a value tag.

Example Embodiment 12

The eNB of Example Embodiment 11, wherein the eNB includes in said first system information value tags, each of which indicates the current version of the corresponding second information system blocks.

Example Embodiment 13

The eNB of Example Embodiment 12, wherein the eNB includes broadcast scheduling information of said second system information in said first system information.

Example Embodiment 14

The eNB of Example Embodiment 12, wherein the eNB broadcasts said second system information based on said scheduling information.

Example Embodiment 15

The eNB of Example Embodiment 12, wherein the eNB includes broadcast scheduling information of said second system information in said first system information after the content of said second system information gets updated.

Example Embodiment 16

The eNB of Example Embodiment 15, wherein the inclusion of said broadcast scheduling information in the first system information is limited for pre-determined times after the content of said second system information gets updated.

Example Embodiment 17

The eNB of Example Embodiment 10, wherein the second system blocks associated with a same value tag is identified by a group index, Example Embodiment 18

The eNB of Example Embodiment 11, wherein the eNB transmits one or plurality of compressed contents based on said scheduling information, each of which is a compressed image of one or plurality of second system information blocks.

Example Embodiment 19

An access node of a radio access network comprising:
processor circuitry configured:
upon a change of content of system information, to include, in a broadcast message comprising first system information which is broadcast from the access node, an indication of when the access node is scheduled to broadcast second system information which is not included in the first system information;
a transmitter configured to transmit, over a radio interface, the broadcast message comprising the first system information and thereafter the broadcast of the second system information according to the indication.

Example Embodiment 20

The access node of Example Embodiment 19, wherein the processor circuitry is further configured, upon the change of content of the system information, to generate multiple broadcasts of the second system information over the radio interface for a predetermined time.

Example Embodiment 21

The access node of Example Embodiment 19, wherein the processor circuitry is further configured, upon the change of content of the system information, to generate the broadcast of the second system information in a compressed format reflecting portions of the second system information that have changed content.

Example Embodiment 22

The access node of Example Embodiment 19, wherein the processor circuitry is further configured, upon the change of content of the system information, to generate the broadcast of the second system information, the broadcast of the second system information comprising an association of a group of system information blocks with a same value tag.

Example Embodiment 23

The access node of Example Embodiment 19, wherein the processor circuitry is further configured the broadcast of the second system information to comprise a value tag.

Example Embodiment 24

The access node of Example Embodiment 19, wherein the first type system information is periodically broadcasted by the transmitter and is required for initial access to the radio access network, and wherein the second type system information is not required for initial access to the radio access network.

Example Embodiment 25

A method in an access node of a radio access network comprising:
upon a change of content of system information, using processor circuitry to include, in a broadcast message comprising first system information which is broadcast from the access node, an indication of when the access node is scheduled to broadcast second system information which is not included in the first system information;
transmitting, over a radio interface, the broadcast message comprising the first system information and thereafter the broadcast of the second system information according to the indication.

Example Embodiment 26

The method of Example Embodiment 25, further comprising, upon the change of content of the system information, generating multiple broadcasts of the updated system information over the radio interface for a predetermined time.

Example Embodiment 27

The method of Example Embodiment 25, further comprising, upon the change of content of the system information, generating the broadcast of the updated system information in a compressed format reflecting portions of the second system information that comprise changed content.

Example Embodiment 28

The method of Example Embodiment 25, further comprising, upon the change of content of the system information, generating the broadcast of the updated system information, the node-available system information comprising an association of a group of system information blocks with a same value tag.

Example Embodiment 29

The method of Example Embodiment 25 further comprising the processor circuitry including a value tag in the broadcast of the second system information.

Example Embodiment 30

The method of Example Embodiment 25 wherein the first type system information is periodically broadcasted by the transmitter and is required for initial access to the radio access network, and wherein the second type system information is not required for initial access to the radio access network.

Example Embodiment 31

A wireless terminal which communicates over a radio interface with an access node of a radio access network comprising:
a receiver configured to receive messages from the access node including a first broadcast message and a second broadcast message;
processor circuitry configured to:
determine, from the first broadcast message, scheduling information concerning the second broadcast message;
obtain system information from the second broadcast message based on the scheduling information.

Example Embodiment 32

The wireless terminal of Example Embodiment 31, wherein the processor circuitry is further configured to:
obtain from the first broadcast message a value tag; and
determine not to request system information from the access node based on the value tag.

Example Embodiment 33

The wireless terminal of Example Embodiment 31, wherein:
the first broadcast message comprises first system information and the scheduling information, and
the second broadcast message comprises second system information that is not included in the first system information.

Example Embodiment 34

The wireless terminal of Example Embodiment 33, wherein the first type system information is periodically broadcasted by the transmitter and is required for initial access to the radio access network, and wherein the second type system information is not required for initial access to the radio access network.

Example Embodiment 35

The wireless terminal of Example Embodiment 31, wherein the receiver is further configured to attempt to receive the multiple second broadcast messages over the radio interface for a predetermined time.

Example Embodiment 36

The wireless terminal of Example Embodiment 31, wherein the processor circuitry is further configured to obtain updated system information included in the second broadcast message in a compressed format reflecting portions of the system information that have changed content.

Example Embodiment 37

The wireless terminal of Example Embodiment 31, wherein the processor circuitry is further configured to obtain updated system information included in the second broadcast message as a group of system information blocks having an associated updated value tag.

Example Embodiment 38

A method in a wireless terminal which communicates over a radio interface with an access node of a radio access network the method comprising:
receiving messages from the access node including a first broadcast message and a second broadcast message;
using processor circuitry to:
determine, from the first broadcast message, scheduling information concerning the second broadcast message;
obtain system information from the second broadcast message based on the scheduling information.

Example Embodiment 39

The method of Example Embodiment 38, wherein the processor circuitry is further configured to:
obtain from the first broadcast message a value tag; and
determine not to request system information from the access node based on the value tag.

Example Embodiment 40

The method of Example Embodiment 38, wherein:
the first broadcast message comprises first system information and the scheduling information, and
the second broadcast message comprises second system information that is not included in the first system information.

Example Embodiment 41

The method of Example Embodiment 40, wherein the first type system information is periodically broadcasted by the transmitter and is required for initial access to the radio access network, and wherein the second type system information is not required for initial access to the radio access network.

Example Embodiment 42

The method of Example Embodiment 38, further comprising attempting to receive multiple second broadcast messages over the radio interface for a predetermined time.

Example Embodiment 43

The method of Example Embodiment 38, further comprising obtaining the second broadcast system information in a compressed format reflecting portions of the system information that have changed content.

Example Embodiment 44

The method of Example Embodiment 38, further comprising obtaining the second broadcast system information as a group of system information blocks having an associated same value tag.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An access node of a radio access network that communicates over a radio interface with a wireless terminal, the access node comprising:
    processor circuitry configured:
        to generate a first type system information block (SIB) comprising information and a value tag, the information indicating whether one or more associated second type system information blocks are provided by broadcast or on-demand, the value tag being updated upon a change of a corresponding second type SIB, the first type SIB being required for the wireless terminal to perform an initial access to the radio access network;
        upon a change of a second type SIB whose associated information indicated before the change that the second type SIB was provided on-demand, to include in the first type SIB the information associated with the second type SIB indicating that the second type SIB is provided by broadcast;
    transmitter circuitry configured to:
        transmit the first type SIB;
        transmit a message that triggers the wireless terminal to receive the first type SIB, wherein;
    whether or not the second type SIB has changed is determined based on a value tag, associated with the second type SIB, stored in the wireless terminal, and the value tag included in the first type SIB corresponding to the second type SIB.

2. The access node of claim 1, wherein the transmitter circuitry is further configured to transmit the second type SIB by broadcast after the change.

3. A method for an access node of a radio access network that communicates over a radio interface with a wireless terminal, the method comprising:
    generating a first type system information block (SIB) comprising information and a value tag, the information indicating whether one or more associated second type system information blocks are provided by broadcast or on-demand, the value tag being updated upon a change of a corresponding second type SIB, the first type SIB being required for the wireless terminal to perform an initial access to the radio access network;
    upon a change of a second type SIB whose associated information indicated before the change that the second type SIB was provided on-demand, including in the first type SIB the information associated with the second type SIB indicating that the second type SIB is provided by broadcast;
    transmitting the first type SIB;
    transmitting a message that triggers the wireless terminal to receive the first type SIB, wherein;
        whether or not the second type SIB has changed is determined based on a value tag, associated with the second type SIB, stored in the wireless terminal, and the value tag included in the first type SIB corresponding to the second type SIB.

4. The method of claim 3, further comprising transmitting the second type SIB by broadcast after the change.

5. A wireless terminal of a radio access network that communicates over a radio interface with an access node of the radio access network comprising:
    receiver circuitry configured to:
        receive a message that triggers reception of a first type system information block (SIB); and
        receive, based on the reception of the message, the first type SIB comprising information and a value tag, the information indicating whether one or more associated second type SIBs are provided by broadcast or on-demand, the value tag being updated upon a change of a corresponding second type SIB, the first type SIB being used to perform an initial access to the radio access network; and
    processor circuitry configured to determine that a second type SIB has changed, based on a value tag, associated with the second type SIB, stored in the wireless terminal, and the value tag included in the first type SIB corresponding to the second type SIB;
    wherein receiver circuitry is configured to perform reception of the second type SIB based on the information associated with the second type system information block, in a case that the second type SIB has change; and
    wherein in a case that the second type SIB was provided on-demand before the change, the information associated with the second type SIB included in the first type SIB indicated that the second type SIB is provided by broadcast.

6. A method for a wireless terminal of a radio access network that communicates over a radio interface with an access node of the radio access network, the method comprising:
    receiving a message that triggers reception of a first type system information block (SIB);
    receiving, based on the reception of the message, the first type SIB comprising information and a value tag, the information indicating whether one or more associated second type SIBs are provided by broadcast or on-demand, the value tag being updated upon a change of a corresponding second type SIB, the first type SIB being used to perform an initial access to the radio access network;
    determining that a second type SIB has changed, based on a value tag, associated with the second type SIB, stored in the wireless terminal, and the value tag included in the first type SIB corresponding to the second type SIB;
    wherein reception of the second type SIB is performed based on the information associated with the second type system information block, in a case that the second type SIB has changed; and wherein in a case that the second type SIB was provided on-demand before the change, the information associated with the second type SIB included in the first type SIB indicates that the second type SIB is provided by broadcast.

* * * * *

(12) INTER PARTES REVIEW CERTIFICATE (4199th)

United States Patent
Ishii

(10) Number: US 10,841,958 K1
(45) Certificate Issued: Nov. 24, 2025

(54) ACCESS NODE, A METHOD FOR AN ACCESS NODE, A WIRELESS TERMINAL AND A METHOD FOR A WIRELESS TERMINAL

(71) Applicant: Atsushi Ishii

(72) Inventor: Atsushi Ishii

(73) Assignee: DAINGEAN TECHNOLOGIES LTD.

Trial Number:

IPR2024-00402 filed Jan. 8, 2024

Inter Partes Review Certificate for:

Patent No.: 10,841,958
Issued: Nov. 17, 2020
Appl. No.: 16/597,325
Filed: Oct. 9, 2019

The results of IPR2024-00402 are reflected in this inter partes review certificate under 35 U.S.C. 318(b).

INTER PARTES REVIEW CERTIFICATE
U.S. Patent 10,841,958 K1
Trial No. IPR2024-00402
Certificate Issued Nov. 24, 2025

AS A RESULT OF THE INTER PARTES REVIEW PROCEEDING, IT HAS BEEN DETERMINED THAT:

Claims 1-4 are cancelled.

7. (substitute for claim 1) *An access node of a radio access network that communicates over a radio interface with a wireless terminal, the access node comprising:*
*processor circuitry configured:*
  *to generate a first type system information block (SIB) comprising information and a value tag associated with a group of plural second type system information blocks fewer than the total number of second type information blocks, wherein each of the second type information blocks in the group has different sibIDs and the group has a group identifier, the information indicating whether one or more associated second type system information blocks are provided by broadcast or on-demand, the value tag being updated upon a change of a corresponding second type SIB belonging to the group, the first type SIB being required for the wireless terminal to perform an initial access to the radio access network;*
  *upon a change of a second type SIB belonging to the group whose associated information indicated before the change that the group containing the second type SIB was provided on-demand, to include in the first type SIB the information associated with the group containing the second type SIB indicating that the group containing the secondo type SIB is provided by broadcast;*
*transmitter circuitry configured to:*
  *transmit the first type SIB;*
  *transmit a message that triggers the wireless terminal to receive the first type SIB, wherein;*
  *whether or not the second type SIB belonging to the group has changed is determined based on a value tag, associated with the group containing the second type SIB, stored in the wireless terminal, and the value tag included in the first type SIB corresponding to the group containing the second type SIB: and*
  *transmit by broadcast after the change the group identifier and the group containing the second type SIB in compressed format including only changed ones of plural parameters of the group containing the second type SIB based on a comparison of the value tag, associated with the group containing the second type SIB, stored in the wireless terminal, and the value tag included in the first type SIB corresponding to the group containing the second type SIB.*

8. (substitute for claim 3) *A method for an access node of a radio access network that communicates over a radio interface with a wireless terminal, the method comprising:*
  *generating a first type system information block (SIB) comprising information and a value tag associated with a group of plural second type system information blocks fewer than the total number of second type information blocks, wherein each of the second type information blocks in the group has different sibIDs and the group has a group identifier, the information indicating whether one or more associated second type system information blocks are provided by broadcast or on-demand, the value tag being updated upon a change of a corresponding second type SIB belonging to the group, the first type SIB being required for the wireless terminal to perform an initial access to the radio access network;*
  *upon a change of a second type SIB belonging to the group whose associated information indicated before the change that the group containing the second type SIB was provided on-demand, including in the first type SIB the information associated with the group containing the second type SIB indicating that the group containing the second type SIB is provided by broadcast;*
  *transmitting the first type SIB;*
  *transmitting a message that triggers the wireless terminal to receive the first type SIB, wherein;*
  *whether or not the second type SIB belonging to the group has changed is determined based on a value tag, associated with the group containing the second type SIB, stored in the wireless terminal, and the value tag included in the first type SIB corresponding to the group containing the second type SIB; and*
  *transmitting by broadcast after the change the group identifier and the group containing the second type SIB in compressed format including only changed ones of plural parameters of the group containing the second type SIB based on a comparison of the value tag, associated with the group containing the second type SIB, stored in the wireless terminal, and the value tag included in the first type SIB corresponding to the group containing the second type SIB.*

\* \* \* \* \*